US012754319B2

(12) United States Patent
Pazhayampallil et al.

(10) Patent No.: US 12,754,319 B2
(45) Date of Patent: Oct. 6, 2026

(54) SYSTEM AND METHOD FOR OBJECT RECONSTRUCTION AND AUTOMATIC MOTION-BASED OBJECT CLASSIFICATION

(71) Applicant: BlueSpace.ai, Inc., Santa Clara, CA (US)

(72) Inventors: Joel Pazhayampallil, Santa Clara, CA (US); Jeremy Templeton, Santa Clara, CA (US); Pavel Shved, Santa Clara, CA (US)

(73) Assignee: BlueSpace.ai, Inc., Santa Clara, CA (US)

( * ) Notice: Subject to any disclaimer, the term of this patent is extended or adjusted under 35 U.S.C. 154(b) by 133 days.

(21) Appl. No.: 18/521,503

(22) Filed: Nov. 28, 2023

(65) Prior Publication Data

US 2024/0094399 A1 Mar. 21, 2024

Related U.S. Application Data

(63) Continuation-in-part of application No. 18/211,171, filed on Jun. 16, 2023, now abandoned, which is a (Continued)

(51) Int. Cl.
*G01S 17/89* (2020.01)
*B60W 10/18* (2012.01)
(Continued)

(52) U.S. Cl.
CPC ............. *G01S 17/89* (2013.01); *B60W 10/18* (2013.01); *B60W 30/0956* (2013.01); (Continued)

(58) Field of Classification Search
CPC ........ G01S 17/89; G01S 17/58; G01S 17/931; B60W 10/18; B60W 30/0956;
(Continued)

(56) References Cited

U.S. PATENT DOCUMENTS 9,903,728 B2 2/2018 Powers et al.
2007/0288133 A1 12/2007 Nishira et al.
(Continued)

FOREIGN PATENT DOCUMENTS

WO 2012172632 A1 12/2012
WO 2019138485 A1 7/2019
(Continued)

OTHER PUBLICATIONS

Australian Examination Report received in Australian Patent Application No. 2021222055 dated Oct. 25, 2022.
(Continued)

*Primary Examiner* — Brian P Sweeney
(74) *Attorney, Agent, or Firm* — Run8 Patent Goup, LLC; Peter Miller; Brian T. Chew

(57) ABSTRACT

A method includes: accessing a depth map, generated by a depth sensor arranged on a vehicle, including a set of pixels representing relative positions and radial velocities of surfaces relative to the depth sensor; correlating a cluster of pixels exhibiting congruent radial velocities with an object in the field of view of the depth sensor; aggregating the cluster of pixels into a three-dimensional object representation of the object; classifying the object into an object class based on congruence between the three-dimensional object representation and a geometry of the object class; characterizing motion of the object based on positions and radial velocities of surfaces represented by the cluster of pixels; and generating a motion command based on the motion of the object and a set of motion characteristics of the object class.

18 Claims, 7 Drawing Sheets

Related U.S. Application Data continuation of application No. 17/182,173, filed on Feb. 22, 2021, now Pat. No. 11,719,821.

(60) Provisional application No. 63/428,334, filed on Nov. 28, 2022, provisional application No. 63/064,316, filed on Aug. 11, 2020, provisional application No. 62/980,131, filed on Feb. 21, 2020, provisional application No. 62/980,132, filed on Feb. 21, 2020.

(51) Int. Cl.

| | |
|---|---|
| ***B60W 30/095*** | (2012.01) |
| ***B60W 30/14*** | (2006.01) |
| ***B60W 30/18*** | (2012.01) |
| ***B60W 40/068*** | (2012.01) |
| ***B60W 40/105*** | (2012.01) |
| ***B60W 60/00*** | (2020.01) |
| ***G01S 17/58*** | (2006.01) |
| ***G01S 17/931*** | (2020.01) |
| ***G06V 10/25*** | (2022.01) |
| ***G06V 20/58*** | (2022.01) |
| ***G06V 20/64*** | (2022.01) |

(52) U.S. Cl.

CPC ........ *B60W 30/146* (2013.01); *B60W 30/181* (2013.01); *B60W 40/068* (2013.01); *B60W 40/105* (2013.01); *B60W 60/0011* (2020.02); *G01S 17/58* (2013.01); *G01S 17/931* (2020.01); *G06V 10/25* (2022.01); *G06V 20/58* (2022.01); *G06V 20/64* (2022.01); *B60W 2420/408* (2024.01); *B60W 2552/40* (2020.02); *B60W 2554/4041* (2020.02); *B60W 2554/80* (2020.02)

(58) Field of Classification Search

CPC ............. B60W 30/146; B60W 30/181; B60W 40/068; B60W 40/105; B60W 60/0011; B60W 2420/408; B60W 2552/40; B60W 2554/4041; B60W 2554/80; G06V 10/25; G06V 20/58; G06V 20/64

See application file for complete search history.

(56) References Cited

U.S. PATENT DOCUMENTS

| | | | | |
|---|---|---|---|---|
| 2010/0295940 | A1 | 11/2010 | Schwarte | |
| 2016/0171898 | A1 | 6/2016 | Silver | |
| 2016/0291149 | A1 * | 10/2016 | Zeng | G01S 13/874 |
| 2019/0049968 | A1 | 2/2019 | Dean et al. | |
| 2019/0219700 | A1 | 7/2019 | Coombe et al. | |
| 2019/0340445 | A1 | 11/2019 | Chowdhury et al. | |
| 2019/0346561 | A1 | 11/2019 | Hofmann | |
| 2019/0361106 | A1 | 11/2019 | Stachnik et al. | |
| 2020/0027230 | A1 | 1/2020 | Zhao et al. | |
| 2020/0211394 | A1 | 7/2020 | King et al. | |
| 2020/0250837 | A1 | 8/2020 | Fagg et al. | |
| 2020/0279436 | A1 * | 9/2020 | Bleyer | G06T 15/005 |

FOREIGN PATENT DOCUMENTS

| | | | |
|---|---|---|---|
| WO | 2020035728 | A2 | 2/2020 |
| WO | 2021016845 | A1 | 2/2021 |
| WO | 2021168452 | A2 | 8/2021 |

OTHER PUBLICATIONS

International Search Report and Written Opinion for International Patent Application No. PCT/US2021/019122 mailed on Sep. 14, 2021; 14 pages.
Non-Final Office Action for U.S. Appl. No. 17/182,165 dated May 19, 2021.
Notice of Allowance and Fees Due for U.S. Appl. No. 17/182,165 dated Oct. 19, 2021.
Notice of Allowance and Fees Due for U.S. Appl. No. 17/182,173 dated Mar. 16, 2023.
Notice of Allowance received in U.S. Appl. No. 17/182,165 dated Sep. 13, 2021.
Office action received in CN 202180030320X dated Jan. 28, 2023.
Office action received in JP 2022-549671 dated Jan. 31, 2023.

* cited by examiner

SYSTEM AND METHOD FOR OBJECT RECONSTRUCTION AND AUTOMATIC MOTION-BASED OBJECT CLASSIFICATION

CROSS-REFERENCE TO RELATED APPLICATIONS

This application is a continuation-in-part of U.S. patent application Ser. No. 18/211,171, filed on 16 Jun. 2023, which is a continuation of U.S. patent application Ser. No. 17/182,173, filed on 22 Feb. 2021, which claims priority to U.S. Provisional Patent Application Nos. 62/980,131, filed on 21 Feb. 2020, 62/980,132, filed on 21 Feb. 2020, and 63/064,316, filed on 11 Aug. 2020, each of which is incorporated in its entirety by this reference.

This application claims priority to U.S. Provisional Patent Application No. 63/428,334, filed on 28 Nov. 2022, which is incorporated in its entirety by this reference.

This application is related to U.S. patent application Ser. No. 17/182,165, filed on 22 Feb. 2021, which is incorporated in its entirety by this reference.

TECHNICAL FIELD

This invention relates generally to the field of object reconstruction and classification and more specifically to a new and useful method for object reconstruction and automatic motion-based object classification in the field of object reconstruction and classification.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHODS

Figure 1:
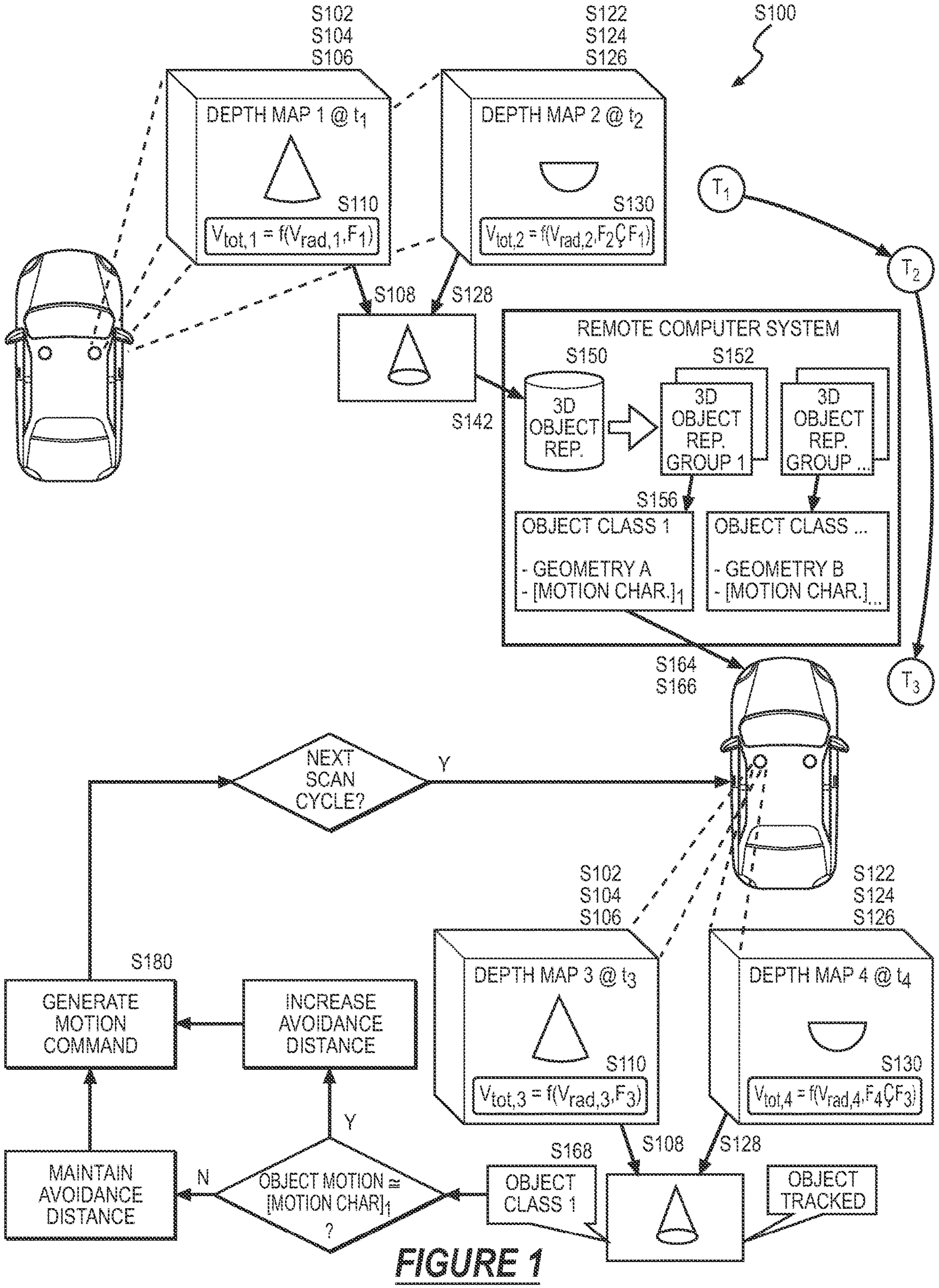
FIG. 1 is a flowchart representation of a method.
Figure 2A:
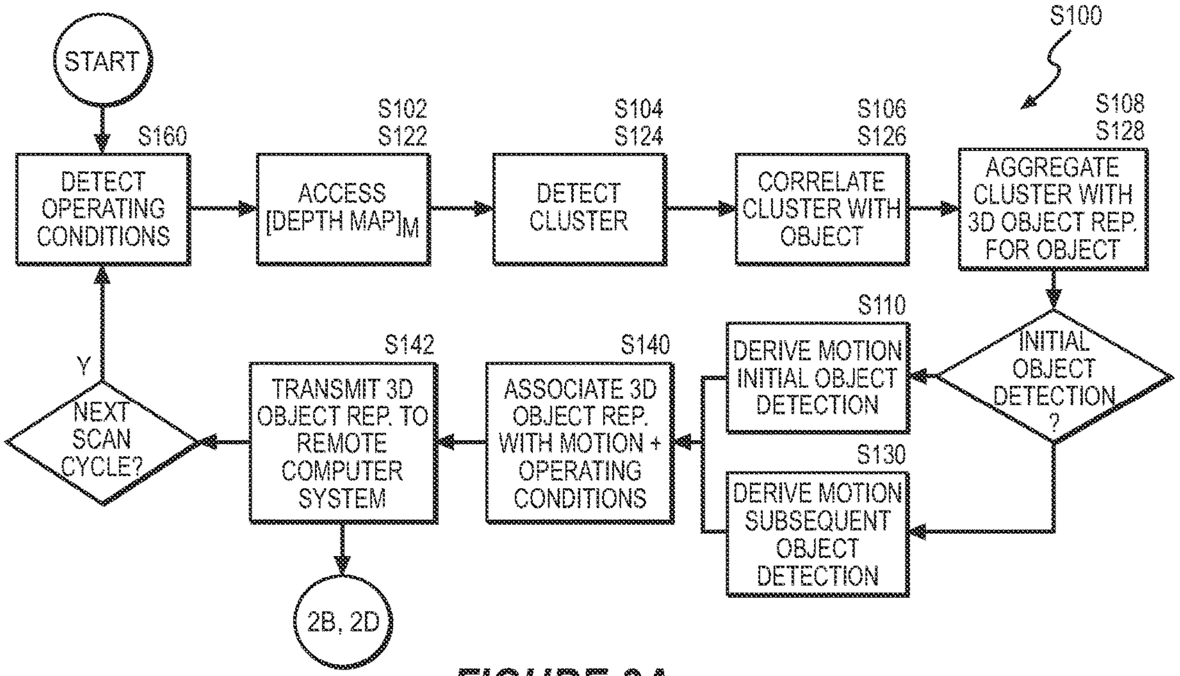
FIGS. 2A, 2B, 2C, 2D, and 2E are flowchart representations of one variation of the method.
Figure 2B:
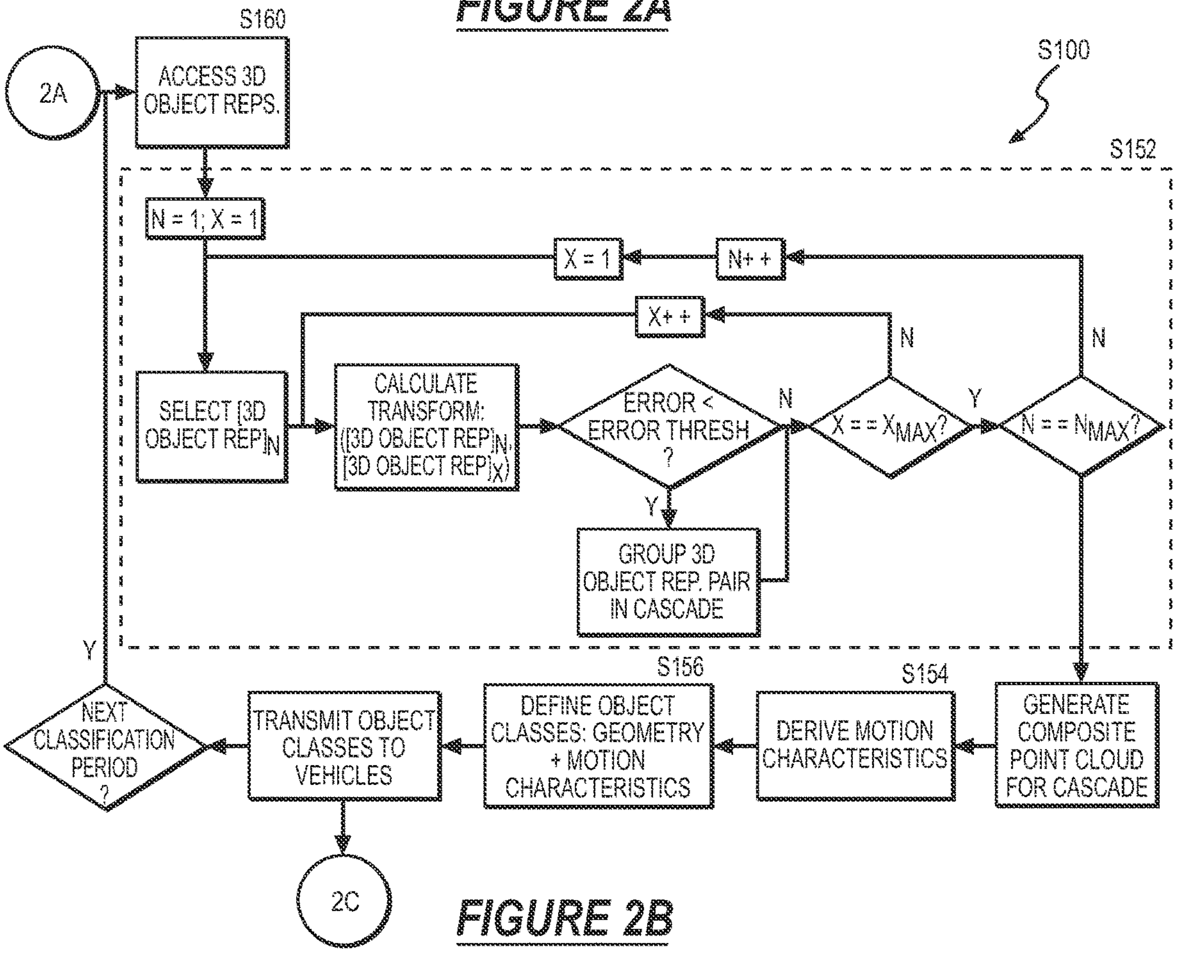
Figure 2C:
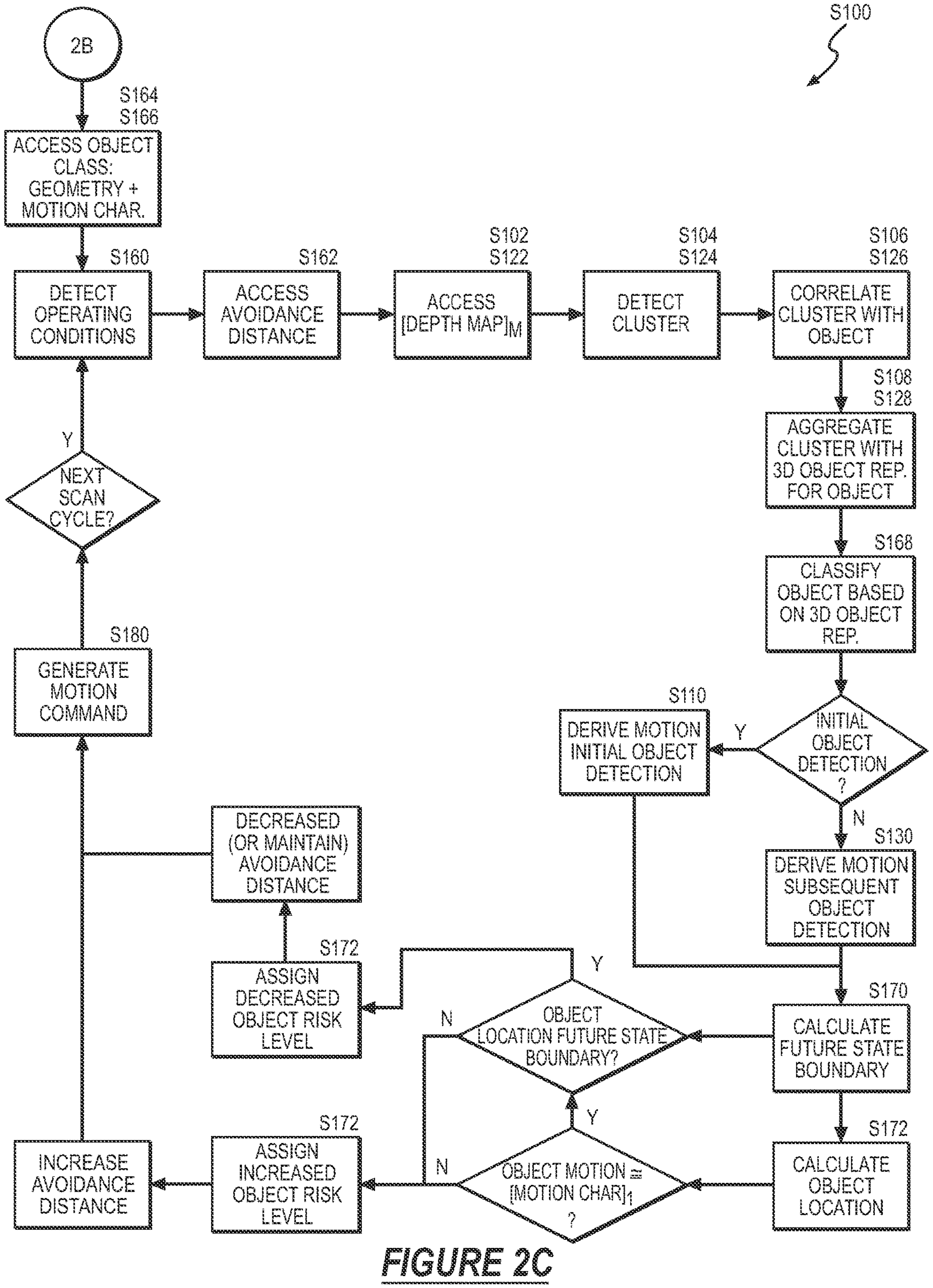

As shown in FIGS. 1 and 2C, a method S100 includes, during a first time period: accessing a first depth map generated by a depth sensor arranged on a vehicle in Block S102, the first depth map including a first set of pixels representing relative positions of a first set of surfaces relative to a field of view of the depth sensor and annotated with radial velocities of the first set of surfaces at a first time; detecting a first cluster of pixels, in the first set of pixels, exhibiting congruent radial velocities in Block S104; accessing a second depth map generated by the depth sensor in Block S122, the second depth map including a second set of pixels representing relative positions of a second set of surfaces relative to the field of view of the depth sensor and annotated with radial velocities of the second set of surfaces at a second time; detecting a second cluster of pixels, in the second set of pixels, exhibiting congruent radial velocities in Block S124; and correlating the first cluster of pixels and the second cluster of pixels with a first object in the field of view of the depth sensor in Blocks S106 and S126.

The method S100 also includes: aggregating the first cluster of pixels and the second cluster of pixels into a first three-dimensional object representation of the first object in Blocks S108 and S128; accessing a first geometry, of a first object class, representing a first group of three-dimensional object representations characteristic of analogous object geometries in Block S164; classifying the first object into the first object class based on congruence between the first three-dimensional object representation of the first object and the first geometry of the first object class in Block S168; characterizing motion of the first object at the second time based on positions and radial velocities of surfaces represented by the first cluster of pixels and the second cluster of pixels in Block S130; accessing a first set of motion characteristics of the first object class in Block S166; and generating a first motion command based on the motion of the first object at the second time and the first set of motion characteristics of the first object class in Block S180.

1.1 Variation: Single Scan Object Classification

Figure 3:
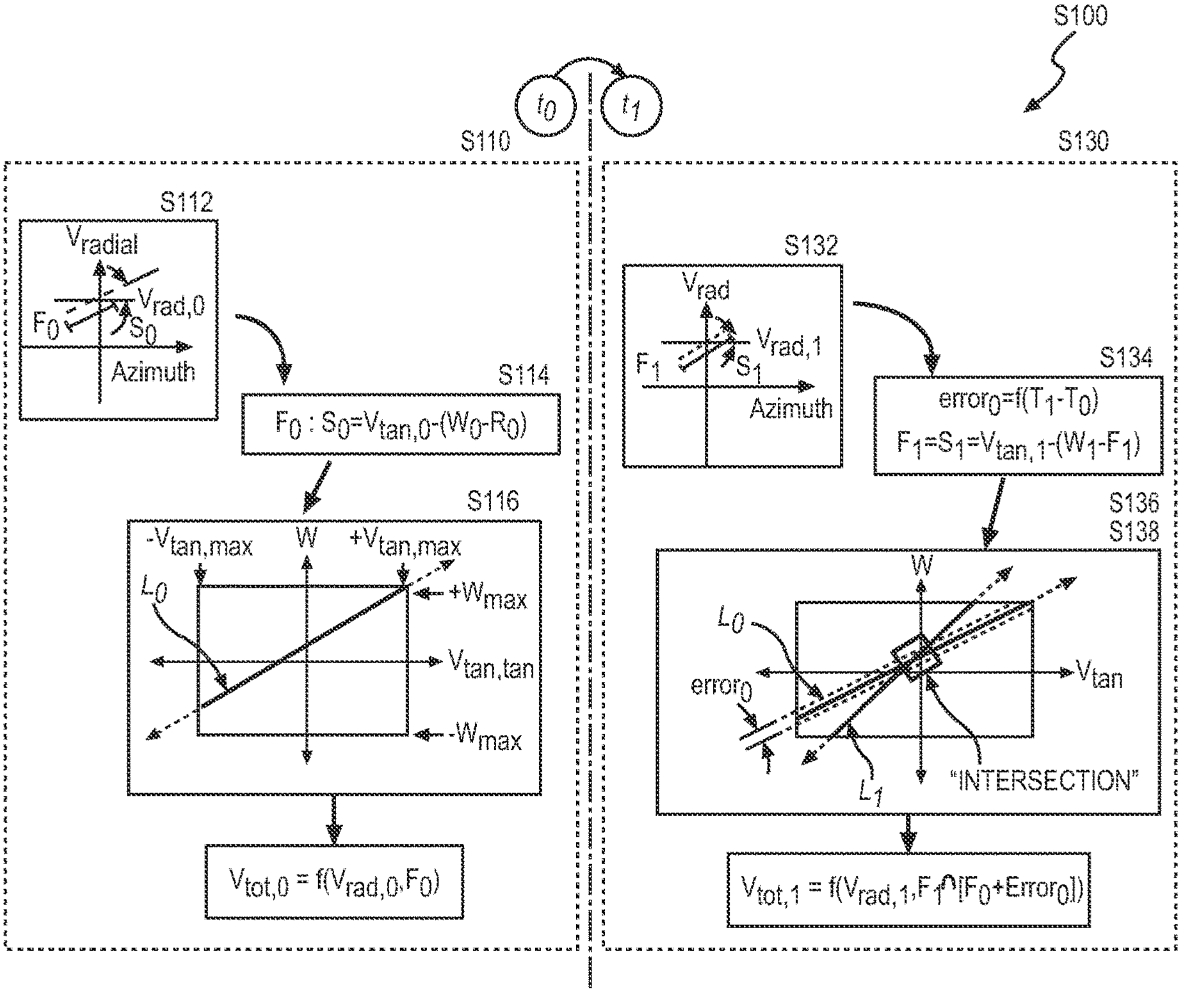
FIG. 3 is a flowchart representation of one variation of the method.

As shown in FIGS. 1, 2C, and 3, one variation of the method S100 includes, during a first time period: accessing a first depth map generated by a depth sensor arranged on a vehicle in Block S102, the first depth map including a first set of pixels representing relative positions of a first set of surfaces relative to a field of view of the depth sensor and annotated with radial velocities of the first set of surfaces at a first time; detecting a first cluster of pixels, in the first set of pixels, exhibiting congruent radial velocities in Block S104; correlating the first cluster of pixels with a first object in the field of view of the depth sensor in Block S106; and aggregating the first cluster of pixels into a first three-dimensional object representation of the first object in Block S108.

This variation of the method S100 also includes: accessing a first geometry, of a first object class, representing a first group of three-dimensional object representations of analogous object geometries in Block S164; classifying the first object into the first object class based on congruence between the first three-dimensional object representation of the first object and the first geometry of the first object class in Block S168; calculating a first correlation between radial velocities and positions of surfaces represented by the first cluster of pixels in Block S112; based on the first correlation, calculating a first function relating a first set of combinations of possible tangential velocities of the first object and possible angular velocities of the first object coherent with radial velocities of the first set of surfaces in Block S114; calculating a first total radial velocity of the first object at the first time based on radial velocities of surfaces in the first set of surfaces in Block S116; and accessing a first set of motion characteristics of the first object class in Block S166.

This variation of the method S100 further includes generating a first motion command, in Block S180, based on: the first set of combinations of possible tangential velocities of the first object and possible angular velocities of the first object, at the first time, defined by the first function; the first total radial velocity of the first object; and the first set of motion characteristics.

1.2 Variation: Concurrent Data from Multiple Sensors

Figure 4:
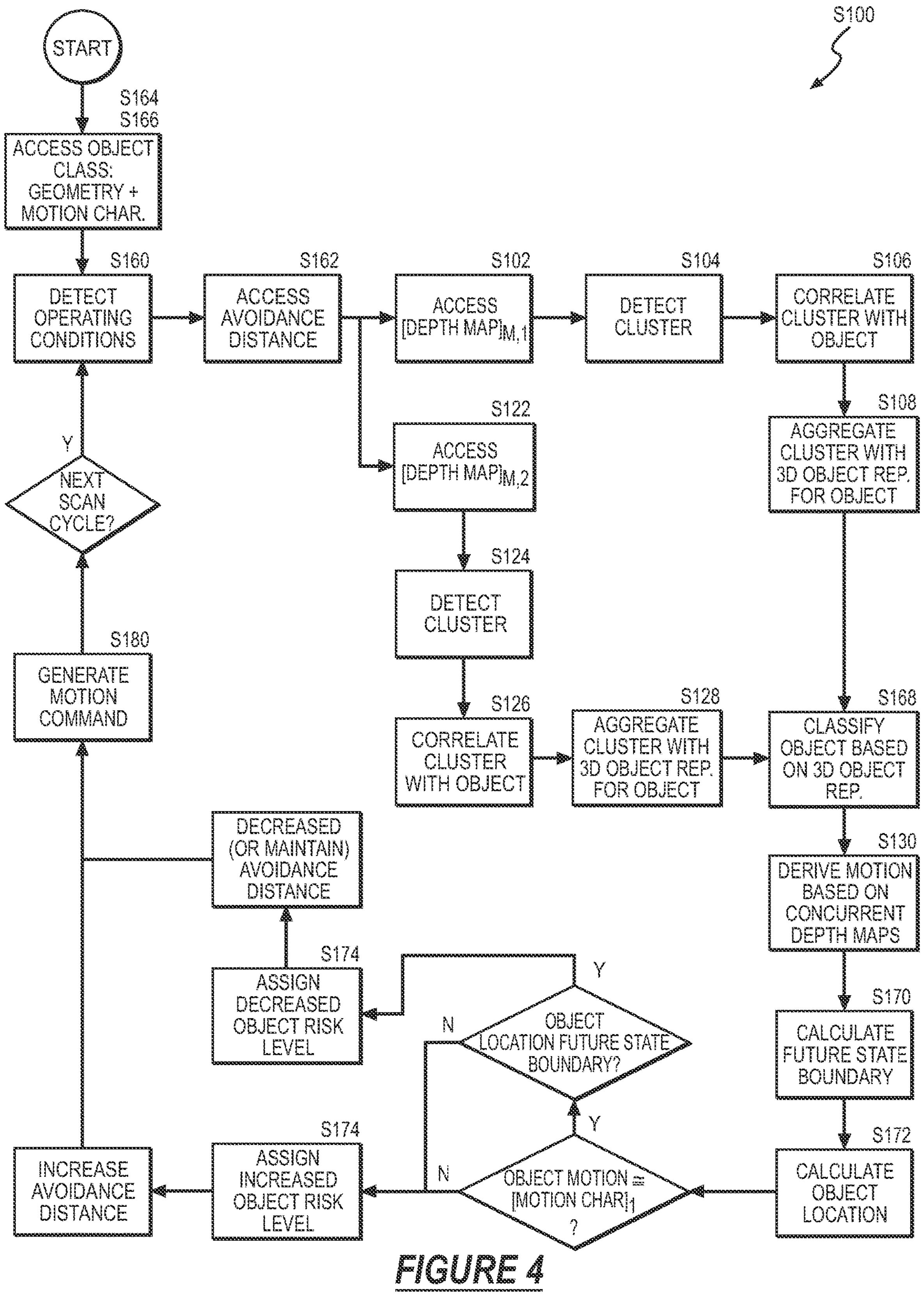
FIG. 4 is a flowchart representation of one variation of the method.

As shown in FIGS. 1 and 4, one variation of the method S100 includes: accessing a first depth map generated by a first depth sensor arranged on a vehicle in Block S102, the first depth map including a first set of pixels representing relative positions of a first set of surfaces relative to a first field of view of the first depth sensor and annotated with radial velocities of the first set of surfaces at a first time; detecting a first cluster of pixels, in the first set of pixels, exhibiting congruent radial velocities in Block S104; accessing a second depth map generated by a second depth sensor in Block S122, the second depth map including a second set of pixels representing relative positions of a second set of surfaces relative to a second field of view of the second depth sensor and annotated with radial velocities of the second set of surfaces at the first time; detecting a second cluster of pixels, in the second set of pixels, exhibiting congruent radial velocities in Block S124; correlating the first cluster of pixels and the second cluster of pixels with a first object in the first field of view of the first depth sensor and in the second field of view of the second depth sensor in Blocks S106 and S126; and aggregating the first cluster of pixels and the second cluster of pixels into a first three-dimensional object representation of the first object in Block S108 and S128.

This variation of the method S100 also includes: accessing a first geometry, of a first object class, representing a first group of three-dimensional object representations of analogous object geometries in Block S164; classifying the first object into the first object class based on congruence between the first three-dimensional object representation of the first object and the first geometry of the first object class in Block S168; characterizing motion of the first object based on positions and radial velocities of surfaces represented by the first cluster of pixels and the second cluster of pixels in Block S130; accessing a first set of motion characteristics of the first object class in Block S166; and, in response to the motion of the first object falling outside of the first set of motion characteristics of the first object class, generating a motion command to increase an offset distance between the vehicle and the first object in Block S180.

2. APPLICATIONS

Generally, a fleet of vehicles (e.g., autonomous vehicles) outfitted with suites of depth sensors can cooperate with a remote computer system to: capture sequences of depth maps generated by depth sensors arranged on each vehicle. Later, a vehicle (e.g., in the fleet) can: detect clusters of points representing an object—in its vicinity—in the sequence of depth maps captured by a set of depth sensors arranged on the vehicle; compile these clusters of points into a three-dimensional representation of the object's geometry; derive motion characteristics of the object from congruent motion of these clusters of points; classify the object—based on its geometry—as one of a particular known object class; and retrieve motion characteristics descriptive of this particular known object class. Then, in response to motion (or "behaviors") of the object falling outside of bounds of motion characteristics descriptive of this particular known object class, the vehicle can: establish lower confidence in the object's intent and predictions of the object's future motion; label or identify the object as high(er) risk; assign an increased avoidance distance to the object; and/or autonomously modify the vehicle's motion (e.g., move away from the object, increase its distance from the object) to compensate for the higher risk of the object.

2.1 Object Class+Motion Derivation and Setup

In one implementation, during a data capture period, a vehicle can: access a depth map (e.g., a point cloud) generated by a set of depth sensors (e.g., a LIDAR sensors configured to detect radial velocity of surfaces) arranged on the vehicle (e.g., an autonomous vehicle); detect clusters of points in the depth map; and characterize each cluster of points as corresponding to a singular object in the field around the vehicle based on congruent or analogous motion (e.g., congruent radial velocities) of points in these clusters. The vehicle can: repeat this process to capture subsequent depth maps and detect clusters of points representing individual objects in these depth maps; and track clusters of points—and therefore individual objects—between these depth maps, such as based on congruent motion and positions of these clusters. The vehicle can then implement methods and techniques described in U.S. patent application Ser. No. 17/182,165 to derive motion of each object in three (or six) degrees of freedom, such as including radial velocity, tangential velocity, and angular (or "yaw") velocity.

For each object thus detected and characterized, the vehicle (or the remote computer system) can: aggregate a series of clusters of points representing the object over time (e.g., over multiple depth maps); and compile (or "reconstruct") these clusters of points into a three-dimensional (hereinafter "3D") representation of the object based on known motion of the vehicle when these depth maps were recorded, derived motion of the object at these times, and positions of the object relative to the vehicle—derived from these depth maps—at these times. The vehicle (or the remote computer system) further associates (or "tags," "labels") this 3D object representation with this derived motion of the object, such as including: maximum and minimum absolute observed radial, tangential, and angular velocities; changes in motion of the object concurrent with changes in presence, relative position, and/or speed of other objects nearby; and changes in motion of the object concurrent with changes in right of way, scene, or signage near the object; etc. Thus, the vehicle (or the remote computer system) can aggregate points from clusters of points depicting the object over time into one composite representation of the object, thereby increasing the resolution of the 3D representation of the object. The vehicle (or the remote computer system) can further aggregate and compile motion characteristics of the object during this observation period, such as basic motion bounds in three (or six) degrees of freedom and/or more complex motion changes responsive to changing conditions around the object.

The remote computer system can then: retrieve a corpus of 3D representations of many objects—and corresponding motion characteristics—from many vehicles; and aggregate these 3D representations into groups exhibiting similar geometries. For each group, the remote computer system can then: define an object class representing the group; retrieve motion characteristics of these individual objects; remove or discard—from this group—any motion characteristics representing motion known or identified as malicious, dangerous, or invalid; and compile the remaining valid motion characteristics of these individual objects into motion bounds (or "behaviors," a "motion model") that represent observed historical motion of the entire group of objects (e.g., both basic motion bounds and more complex motion changes responsive to changing local conditions). Therefore, the remote computer system can define an object class according to a unique geometry (e.g., a size, a shape) shared by objects in this class and derive motion characteristics that describe the bounds of past observed motions of objects exhibiting (very) similar geometries.

For example, the remote computer system can: access a set of 3D object representations of a population of objects—annotated with motions—previously generated by a fleet vehicles; define a group of 3D object representations exhibiting analogous object geometries; aggregate the group of 3D object representations into a single composite 3D object representation that defines the geometry of an object class corresponding to objects in this group; and derive generic motion characteristics of the object class based on specific past observed motions of objects within this group.

In this example, the remote computer system can aggregate groups of 3D object representations—exhibiting similar or identical geometries—into multiple distinct object classes, such as: a pedestrian vehicle (e.g., a sports utility vehicle, a sedan) class; a semi-trailer truck class; a pedestrian class; a motorcycle class; a bicycle class; and/or an all-terrain vehicle class.

In this example, the remote computer system can also derive motion bounds (e.g., a radial velocity range, an angular velocity range, a deceleration range) for each object class given different local conditions (or "environment contexts") around the vehicle, such as: traffic conditions; current weather forecast; a road type; and/or local pedestrian volume. Therefore, the remote computer system can: define object classes based on similar and identical geometries of objects represented in past depth maps; and derive motion boundaries (or "behaviors") for each object class based on past observed motions of objects in each class. Thus, the remote computer system can: reduce (or eliminate) error associated with human labeling of objects and improve resolution of object detection rather than relying on color images in which human-readable object class labels (e.g., pedestrian, vehicle) are not necessary or useful for the machine; and reduce (or eliminate) computational resources associated with data collection since the remote computer system can define object classes and derive motion boundaries automatically with data contained in sequences of depth maps containing radial velocity information.

2.2 Object Classification by Geometry+Motion Verification for Intent Validation

The remote computer system can then: load the composite object representations (e.g., three-dimensional point clouds) and corresponding motion bounds for each object class onto a vehicle to enable the vehicle to autonomously classify an object based on its geometry observed in one or over multiple depth maps; retrieve motion bounds previously observed for other objects in this class; and verify that intent of the object aligns with intent of past objects in the class, that the object's motion is predictable, and that the object exhibits a low risk of intent if the current (and past) motion of the object falls within the motion bounds of this object class.

More specifically, during an autonomous operating period by the vehicle, the remote computer system can: access depth maps captured across multiple instances in time by the depth sensor; and detect clusters of points exhibiting congruent motion characteristics to generate a second 3D object representation of a second object in the field of view of the vehicle. More specifically, the remote computer system can: correlate a second set of clusters of points with a second object; and aggregate the second set of clusters of points into a second 3D object representation of the second object. The remote computer system can then: classify the second object in the first object class (e.g., a sports utility vehicle) based on congruence between the second 3D object representation and the geometry of the first object class; and assign motion characteristics of the first object class to the second object. In this example, the remote computer system can detect new objects in the field of view of the vehicle and classify the objects based on motion characteristics unique to each object. Thus, the remote computer system can reduce error (e.g., human error) associated with manual labeling and characterization of objects by automatically classifying objects into object classes according to similarities in motion behaviors and 3D geometry.

In one implementation, the remote computer system can trigger the vehicle to adjust motion behavior (e.g., stop, decrease speed, increase distance from the object, veer left, change lane on road) in response to detecting an object exhibiting anomalous motion characteristics. For example, in response to motion of the second object falling outside of motion bounds associated with the first object class (e.g., a speed range: 30-35 mph, an angular velocity range 0.01-0.2 rad/sec), the remote computer system can: generate a command to increase an offset distance between the vehicle and the second object based on an avoidance distance. Therefore, the remote computer system can increase vehicle safety by increasing the distance between the vehicle and the object when the remote computer system detects anomalous motion of the object according to the object class of the object.

2.3 Variation: Object Classification by Motion Signature

As described herein, the remote computer system executes Blocks of the method S100: to aggregate 3D object representations generated by a fleet of vehicles during a data capture period; to define a set of object classes exhibiting analogous object geometries based on these 3D object representations; and to define a set of motion characteristics representative of each object class. However, the remote computer system can similarly execute Blocks of the method S100 to: retrieve a corpus of 3D representations of many objects—and corresponding motion characteristics—from many vehicles; aggregate these 3D representations into groups exhibiting similar motion properties; to define object classes representing these groups; and to associate these motion properties with each object class.

Therefore, a vehicle can then automatically classify an object based on correspondence between its observed motion and the motion properties associated with a particular object class.

2.4 Variation: Local Classification

As described herein, the remote computer system executes Blocks of the method S100: to aggregate 3D object representations generated by a fleet of vehicles during a data capture period; to define a set of object classes exhibiting analogous object geometrics based on these 3D object representations; and to define a set of motion characteristics representative for each object class. However, a vehicle can similarly execute Blocks of the method S100 to aggregate 3D object representations generated by the vehicle (or other vehicles) during a data capture period; to define a set of object classes exhibiting analogous object geometrics (or motions) based on these 3D object representations; and to define a set of motion characteristics (or object geometries) representative for each object class.

2.5 Variation: Other Sensing Modalities

As described herein, the system executes Blocks of the method S100: to aggregate 3D object representations generated by a fleet of vehicles during a data capture period; to define a set of object classes exhibiting analogous object geometrics based on these 3D object representations. However, the system can similarly execute Blocks of the method S100 to aggregate object representations based on other sensing modalities; to define a set of object classes exhibiting analogous object signatures in these modalities (e.g., heat signatures, light reflection/absorption signatures) based on these object representations; and to define a set of motion characteristics (or object geometries) representative for each object class.

3. SYSTEM

Generally, as shown in FIG. 1, the system can include (or interface with) a fleet of vehicles (e.g., autonomous vehicles) and a remote computer system (e.g., a remote cloud computing system, an in-field remote computer system). The remote computer system can communicatively couple with a vehicle, in the fleet of vehicles, via a communication network (e.g., wired communication network, wireless communication network, the Internet).

3.1 Autonomous Vehicle

The autonomous vehicle can include: a suite of sensors configured to collect data representative of objects in the field around the autonomous vehicle; local memory that stores a navigation map defining a route for execution by the autonomous vehicle, and a localization map that represents locations of immutable surfaces along a roadway; and a controller. The controller can: calculate the location of the autonomous vehicle in real space based on sensor data collected from the suite of sensors and the localization map; calculate future state boundaries of objects detected in these sensor data according to Blocks of the method S100; elect future navigational actions based on these future state boundaries, the real location of the autonomous vehicle, and the navigation map; and control actuators within the vehicle (e.g., accelerator, brake, and steering actuators) according to these navigation decisions.

In one implementation, the autonomous vehicle includes a set of 360° LIDAR sensors arranged on the autonomous vehicle, such as one LIDAR sensor arranged at the front of the autonomous vehicle and a second LIDAR sensor arranged at the rear of the autonomous vehicle, or a cluster of LIDAR sensors arranged on the roof of the autonomous vehicle. Each LIDAR sensor can output one three-dimensional distance map (or depth map)—such as in the form of a 3D point cloud representing distances between the LIDAR sensor and external surface within the field of view of the LIDAR sensor—per rotation of the LIDAR sensor (i.e., once per scan cycle). The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field.

The autonomous vehicle can additionally or alternatively include a set of color cameras facing outwardly from the front, rear, and/or sides of the autonomous vehicle. For example, each camera in this set can output a video feed of digital photographic images (or "frames") at a rate of 20 Hz. The autonomous vehicle can also include a set of RADAR sensors facing outwardly from the autonomous vehicle and configured to detect presence and speeds of objects near the autonomous vehicle. The controller in the autonomous vehicle can thus fuse data streams from the LIDAR sensor (s), the color camera(s), and the RADAR sensor(s), etc. into one scan image—such as in the form of a 3D color map or 3D point cloud containing constellations of points that represent roads, sidewalks, vehicles, pedestrians, etc. in the field around the autonomous vehicle—per scan cycle.

However, the autonomous vehicle can include any other sensors and can implement any other scanning, signal processing, and autonomous navigation techniques or models to determine its geospatial position and orientation, to perceive objects in its vicinity, and to elect navigational actions based on sensor data collected via these sensors.

3.1.1 Object Location and Motion Data

In one implementation, the autonomous vehicle includes a sensor that outputs a scan image containing a constellation of points, wherein each point in this scan image: represents a position of a surface in the environment relative to the sensor (or to the autonomous vehicle more generally); and specifies a speed of this surface along a ray extending from the sensor (or the autonomous vehicle more generally) to this surface.

In one example, the autonomous vehicle includes a 3D scanning LIDAR sensor configured to detect distances and relative speeds of surfaces—along rays extending from the sensor (or the autonomous vehicle more generally) to these surfaces—in the field around the autonomous vehicle. In this example, the 3D scanning LIDAR sensor can: represent a position of a surface in the field in spherical coordinates in a polar coordinate system—that defines an origin at the 3D scanning LIDAR sensor (or at a reference position on the autonomous vehicle); and store these polar coordinates in one scan image per scan cycle (e.g., per rotation) of the sensor. Therefore, in this example, the autonomous vehicle can access a scan image containing data captured by a four-dimensional light detection and ranging sensor: mounted on the autonomous vehicle; and configured to generate scan images representing positions and speeds of surfaces within the field relative to the sensor.

In this example, the autonomous vehicle can include multiple such 3D scanning LIDAR sensors, each configured to output one scan image per scan cycle. The autonomous vehicle can then fuse concurrent scan images output by these sensors into one composite scan image for this scan cycle.

Alternately, the autonomous vehicle can include a suite of sensors that capture data of different types and can fuse outputs of these sensors into a scan image containing points at locations of surfaces in the field and annotated with speeds of these surfaces along rays extending between the autonomous vehicle and these surfaces. For example, the autonomous vehicle can include a 3D scanning LIDAR sensor: that defines a LIDAR field of view; and configured to generate a 3D point cloud containing a constellation of points during a scan cycle, wherein each point defines a position of a region on a surface in the environment around the autonomous vehicle. In this example, the autonomous vehicle can also include a fixed or scanning RADAR sensor: that defines a RADAR field of view that intersects the LIDAR field of view; and that generates a list of objects or surfaces in the RADAR field of view during a scan cycle, wherein each object or surface in this list is annotated with a speed relative to the RADAR sensor. The autonomous vehicle then merges concurrent outputs of the LIDAR and RADAR sensors during a scan cycle to annotate points in the 3D point cloud with speeds of corresponding objects or surfaces detected by the RADAR sensor.

However, the autonomous vehicle can include any other type or configuration of sensors and can access or construct a scan image representing relative positions and relative speeds of objects or surfaces in the field around the autonomous vehicle during a scan cycle.

3.1.2 Preloaded Assumptions/Rules

The autonomous vehicle can also store predefined worst-case motion assumptions for a generic object. In particular, the autonomous vehicle can store assumptions for most aggressive (or "worst-case") motion and motion changes of any object that the autonomous vehicle may encounter during operation and apply these worst-case motion assumptions to predict future states of all objects it encounters (e.g., pedestrians, passenger vehicles, trucks, trailers, RVs, motorcycles, street signs, lamp posts, traffic signals, telephone poles, buildings) throughout operation.

For example, the autonomous vehicle can store: a maximum possible speed of a generic object (e.g., 100 miles per hour; 55 meters per second); and a maximum possible linear acceleration of a generic object in any direction (e.g., 9 meters per second per second). The autonomous vehicle can also store a maximum possible angular velocity of a generic object in any direction, such as an inverse function of speed of the object. For example, the autonomous vehicle can store a maximum possible angular velocity function that outputs a maximum possible angular velocity of a generic object—about its center—that decreases as a linear speed of the generic object increases. Therefore, in this example, the maximum possible angular velocity function can predict a maximum possible angular velocity for a generic object when the generic object is at rest. (For example, a pedestrian standing still may exhibit a greater maximum possible angular velocity than a sports car traveling at 30 meters per second.)

The autonomous vehicle can also store object avoidance rules, such as a minimum temporal or spatial margin between the autonomous vehicle and a future state boundary of any object in the vicinity of the autonomous vehicle.

3.1.2 Stopping Distance and Stopping Duration

Generally, the autonomous vehicle estimates a time and/or distance in the future at which the autonomous vehicle may reach a full stop—if the autonomous vehicle were to immediately initiate an emergency stop procedure—based on its current speed. For example, the autonomous vehicle can implement (or execute) a preloaded function that converts vehicle speed directly into stopping duration and/or stopping distance.

In another implementation, the autonomous vehicle estimates road surface qualities based on data collected by various sensors in the autonomous vehicle. For example, the autonomous vehicle: detects presence of puddles or standing water in color images; and estimates dampness of the road surface based on presence and distribution of such puddles or standing water. In another example, the autonomous vehicle: extracts color data and texture information from color images captured by cameras on the autonomous vehicle; and interprets a type of road surface around the autonomous vehicle (e.g., maintained asphalt, asphalt in disrepair, smooth concrete, textured concrete, gravel, dirt, grass, standing water). In this implementation, the autonomous vehicle can then calculate or retrieve a friction coefficient for the road surface based on this estimated dampness and surface type of the road. Based on a brake efficiency model for the autonomous vehicle, the autonomous vehicle can additionally or alternatively calculate a braking efficiency coefficient based on: mileage since the autonomous vehicle's last brake service; and/or mileage since the autonomous vehicle's last tire change. The autonomous vehicle can then—based on the braking model—estimate a stopping distance and/or a stopping duration based on: the current vehicle speed; the friction coefficient; and/or the braking efficiency coefficient.

However, the autonomous vehicle can implement any other methods or techniques to estimate the current stopping distance and/or the current stopping duration of the autonomous vehicle.

The autonomous vehicle can also add a safety margin to these stopping distance and/or stopping duration values, such as: by adding three meters to the stopping distance; by adding two seconds to the stopping duration; or by multiplying these values by a safety margin (e.g., "1.2").

The autonomous vehicle can then calculate a critical time—representing a soonest time that the autonomous vehicle may brake to a full stop—by calculating a sum of the current time and the stopping duration.

2.1.4 Bounded Future State

Generally, the autonomous vehicle can merge limited motion data of the object thus derived from the current scan image in which the object was first detected and worst-case assumptions for adversarial actions by the object to calculate an extent of the ground area accessible to the object from the current time to the critical time (i.e., over the subsequent stopping duration) and to store this accessible ground area as a future state boundary of the object.

More specifically, when the autonomous vehicle first detects an object in a scan image, the autonomous vehicle can: estimate a position of a center of the object relative to the autonomous vehicle near a centroid of the points associated with this object in this scan image; derive a yaw rate of the object relative to the autonomous vehicle based on speed values stored in this group of points associated with this object in the scan image; and derive a speed of the object in the radial direction (i.e., along a ray extending from the autonomous vehicle to the object) as described above. However, the scan image in which the autonomous vehicle first detects the object may not contain sufficient data to enable the autonomous vehicle to derive the absolute velocity of the object or the speed of the object perpendicular to the radial direction (hereinafter the azimuthal direction). Therefore, the autonomous vehicle can implement worst-case assumptions for the current speed of the object and future accelerations of the object to calculate a future state boundary that represents a ground area that is accessible to the object from the current time to the critical time in a worst-case scenario.

3.1.5 Access Zone

Generally, the vehicle can execute methods and techniques described in U.S. patent application Ser. No. 17/182,165 to calculate future state boundaries for many discrete objects detected in a scan image, to define one or more virtual objects behind each of these detected objects, to define a virtual future state boundary for each of these objects, and to refine the future state boundaries over time. The autonomous vehicle can then elect a next navigational action based on a subset of these detected and virtual objects based on proximity of the autonomous vehicle to future state boundaries of these detected and virtual objects.

4. OBJECT DETECTION AND MOTION DERIVATION

Generally, the vehicle can implement methods and techniques described in U.S. patent application Ser. No. 17/182,165 to detect a cluster of points (e.g., a point cloud) in a depth map captured by a depth sensor arranged on a vehicle. For example, the vehicle can: access a first depth map generated by a depth sensor arranged on the vehicle. In this example, the first depth map can include a first set of pixels representing relative positions of a first set of surfaces in a field of view of the depth sensor and annotated with radial velocities of the set of surfaces (and additional information specified in additional channels) at a first time. The vehicle can then: detect a first cluster of points exhibiting congruent motion (e.g., radial velocities), in the first depth map; and track the first cluster of points in a second depth map captured at a time proceeding (or immediately after) the first time. Thus, in this example, the vehicle can derive motion of an object represented by the cluster of points, in three (or six) degrees of freedom, from radial velocities of points in these clusters in the first and second depth maps and therefore motion of the vehicle from the first time to the second time.

In one implementation, following receipt (or generation) of a scan image for the current scan cycle, the autonomous vehicle associates groups of points in the scan image with discrete objects in the field around the autonomous vehicle. For example, the autonomous vehicle can: aggregate a group of points clustered at similar depths from the autonomous vehicle and that are tagged with speeds (e.g., range rates, azimuthal speeds) that are self-consistent for a contiguous object; and associate this group of points with one object in the field.

The autonomous vehicle can then extract a radial speed (or "range rate") of the object along a ray extending from the autonomous vehicle to the object (hereinafter the "radial direction") and an angular velocity of the object relative to the autonomous vehicle from this scan image. For example, the autonomous vehicle can: transform the radial speeds of points defining this object into absolute speeds in an absolute reference system based on a location and a velocity of the autonomous vehicle in the absolute reference system at the current time; and calculate an angular velocity (or "yaw") of the object about its center in the absolute reference system during the current scan cycle based on a difference between the absolute radial speeds of the leftmost point(s) and the rightmost point(s) contained in the group of points associated with this object. In this example, the autonomous vehicle can also: average radial speeds stored in a subset of points near the centroid of this group of points that define this object; and store this average radial speed as the radial speed of the object—relative to the autonomous vehicle—in a radial direction along a ray from the center of the autonomous vehicle to the centroid of this group of points. (The autonomous vehicle can also transform this radial speed of the object relative to the autonomous vehicle into an absolute speed of the object in the radial direction based on the velocity and angular speed of the autonomous vehicle during this scan cycle.)

The autonomous vehicle can repeat this process for other groups of points—in this scan image—representing other objects in the field around the autonomous vehicle.

4.1 Motion Disambiguation

Generally, the autonomous vehicle: derives a relationship between tangential and angular velocities of an object in its field based on characteristics of a group of points representing the object in a scan image output by a sensor on the autonomous vehicle; further bounds the possible current motion of this object based on the measured radial velocity of the object and this derived relationship between the tangential and angular velocities of the object; and further refines a future state boundary calculated for this object based on possible current motion of the object and motion limit assumptions of ground-based objects.

In particular, the autonomous vehicle can leverage a relationship between radial distance, radial velocity, tangential velocity, and angular velocity of an object and a limited number of (e.g., as few as two) distance, angle, and range rate measurements to calculate a narrow range of possible tangential and angular velocities of the object and therefore a narrow range of possible total velocities of the object during a singular scan cycle. The autonomous vehicle can also: track the object in a scan image output by the sensor during a next scan cycle; repeat the foregoing process based on this next scan image; and merge results of the current and preceding scan cycles to narrow a motion estimate of the object to a singular set of tangential, angular, and total velocity values (or very narrow ranges thereof). Then, rather than calculate a future state boundary of the object based on maximum acceleration assumptions and a maximum velocity and a range of possible velocities of the object, the autonomous vehicle can instead calculate a narrower future state boundary of the object based on maximum acceleration assumptions and a singular total velocity of the object derived by the autonomous vehicle with two independent measurements. More specifically, the autonomous vehicle can execute Blocks of the method S100 to compress a set of two-dimensional motion possibilities of a nearby object into a set of one-dimensional motion possibilities for this object.

Generally, motion of ground-based objects (e.g., vehicles, pedestrians), may occur approximately with in a horizontal plane (i.e., parallel to a ground plane), including linear motion along an x-axis, linear motion along a y-axis, and rotation about a z-axis normal to the horizontal plane, which may be represented as a linear velocity in the horizontal plane and an angular velocity about an axis normal to the horizontal plane. This variation of the method S100 is thus described below as executed by the autonomous vehicle to derive tangential, angular, and total velocities of an object within a horizontal plane given radial velocities and positions (e.g., ranges and angles) of points on the object in the horizontal plane. However, the autonomous vehicle can implement similar methods and techniques to derive linear and angular velocities of objects in 3D space (i.e., three linear velocities and three angular velocities) and an absolute or relative total velocity of objects accordingly in 3D space.

More specifically, the sensor may be configured to return range (i.e., distance), azimuth angle, and speed along a ray from a surface in the field back to the sensor (i.e., radial velocity or "Doppler") for each surface in the field that falls within the field of view of the sensor during a scan cycle. The tangential velocity (e.g., linear motion in a direction perpendicular to the radial velocity and in a horizontal plane) and angular velocity (e.g., angular motion about a yaw axis of the autonomous vehicle) of a group of surfaces—that represent an object in a scan image—are contained in the range, azimuthal angle, and speed data of points in this scan image. However, the specific tangential and angular velocities of the object are indeterminate from range, azimuth angle, and radial velocity contained in this group of points. Furthermore, tracking the object across multiple scan images and deriving a tangential velocity of the object from changes in position of the object depicted across multiple scan images introduces significant error: especially if the perspective of the object in the field of view of the autonomous vehicle changes from one scan cycle to the next because the object will appear to change in size over consecutive scan cycles, which will be incorrectly represented in the calculated tangential velocity of the object; especially if a region of the object obscured from the sensor changes over consecutive scan cycles because the velocity of the sensible window over the visible region of the object will be incorrectly represented in the calculated tangential velocity of the object; and especially insofar as points across two consecutive scan images are unlikely to represent the same surfaces on the object if the object moves relative to the autonomous vehicle over consecutive scan cycles.

However, the autonomous vehicle can execute Blocks of the method S100 to derive a first relationship (or "correlation") between tangential and angular velocities of the object during a first scan cycle based on range, azimuth angle, and radial velocity data contained in a group of points representing an object in a first scan image. The autonomous vehicle can then: repeat this process during a second scan cycle to calculate a second relationship between tangential and angular velocities of the object during a second scan cycle based on range, azimuth angle, and radial velocity data contained in a group of points representing the object in a second scan image; and derive a specific tangential velocity and specific angular velocity (or a narrow range thereof) of the object that is congruent with both the first and second relationships.

4.1.1 Motion Disambiguation: First Scan Cycle

In one implementation, a sensor on the autonomous vehicle executes a first scan cycle at a first time $T_0$ and returns a first scan image containing radial velocities, distances, and angular positions of a constellation of points (e.g., small surfaces, areas) throughout the field around the autonomous vehicle. The autonomous vehicle then: implements methods and techniques described above to identify a group (or "cluster") of points corresponding to a discrete object in the field; and calculates a radial velocity $V_{rad,0}$ of the object at $T_0$ based on a measure of central tendency of the radial velocities of points in this group. For example, the autonomous vehicle can calculate this measure of central tendency as the arithmetic mean of the radial velocities of points in this group. Similarly, the autonomous vehicle can calculate a first radius $R_0$ of the object at $T_0$ based on (e.g., equal to) a difference between the maximum and minimum azimuthal positions of points in the group—that is, a radial length of the group of points.

The autonomous vehicle then: calculates positions of points in the group relative to the autonomous vehicle (e.g., within a polar coordinate system) based on the range values and angular positions of these points at $T_0$; and calculates a correlation between the angular positions and radial velocities of these points. In one example, the autonomous vehicle calculates this correlation as the slope of the best-fit (or "trend") line through these radial velocities divided by: the cosine of the angles between the points and the average position of this group of points; and the sine of the angles between the points and the average position of this group of points.

The autonomous vehicle then calculates a first slope $S_0$ of this best-fit line, which represents a relationship between the tangential velocity $V_{tan,0}$ and the angular velocity $\omega_0$ of the object at time $T_0$. In particular, this slope $S_0$ may represent a difference between: $V_{tan,0}$; and the product of $\omega_0$ multiplied by a first radius $R_0$ of the object, in the field of view of the sensor, at time $T_0$. The autonomous vehicle can therefore generate a first function (e.g., a linear function) $F_0$ that relates $V_{tan,0}$ and $\omega_0$ of the object based on the slope $S_0$ and the radius $R_0$ at time $T_0$.

Based on function $F_0$, the autonomous vehicle can then calculate line $L_0$, which represents possible $V_{tan,0}$ and $\omega_0$ motion combinations of the object at time $T_0$ given the current radial velocity $V_{rad,0}$ of the object at $T_0$.

In a similar implementation, the autonomous vehicle solves for the motion of the object in three degrees of freedom, including: linear motion in the radial direction (i.e., a radial velocity) along a ray between the sensor and the object; linear motion in a tangential direction orthogonal to the radial direction and in a horizontal plane; and angular motion in a yaw direction about an axis orthogonal to the radial and tangential directions. In this implementation, the autonomous vehicle can: project first radial velocities versus first azimuthal positions of points—in the first group of points representing the object—onto a horizontal plane (i.e., a 2D space approximately parallel to a road surface); calculate a first radius of the object at the first time based on a range of first azimuthal positions of points in the first group of points; calculate a first radial velocity of the object—relative to the autonomous vehicle—at the first time based on a first measure of central tendency (e.g., a mean) of first radial velocities of points in the first group of points; calculate a first linear trend line through first radial velocities versus first azimuthal positions of points in the first group of points; and calculate a first correlation based on a first slope of the first linear trend line, which represents a relationship between a first tangential velocity of the object and a first angular velocity of the object at the first time. In particular, the first slope can represent a difference between: the first tangential velocity of the object at the first time; and the product of the first radius of the object at the first time and the first angular velocity of the object at the first time. The autonomous vehicle can then calculate a first linear function that relates possible tangential velocities of the object at the first time and possible angular velocities of the object, relative to the autonomous vehicle, at the first time based on the first slope and the first radius at the first time (e.g., the possible tangential velocities and angular velocities that satisfy the relation: $S_0=V_{tan,0}-R_0\omega_0$). More specifically, this first function can relate possible tangential velocities of the object and possible angular velocities of the object, at the first time, within a horizontal plane approximately parallel to a road surface.

Therefore, the autonomous vehicle can compress a 2D surface of possible $V_{tan,0}$ and $\omega_0$ motion combinations of the object—previously bounded only by maximum velocity assumptions of ground-based objects described above—into a 1D line of possible $V_{tan,0}$ and $\omega_0$ motion combinations of the object at time $T_0$. More specifically, the autonomous vehicle can thus reduce three unknown characteristics of the object moving in 2D space (i.e., $V_{rad,0}$, $V_{tan,0}$, $\omega_0$) down to a singular unknown—that is, which point along line $L_0$ represents the true $V_{tan,0}$ and $\omega_0$ of the object at $T_0$, as all combinations of $V_{tan,0}$ and $\omega_0$ on $L_0$ resolve the measured radial velocities of the object at $T_0$.

4.1.2 Bounding

In this implementation, the autonomous vehicle can also: calculate a range of $V_{tan,0}$ and $\omega_0$ values that, in combination with $V_{rad,0}$, produce a maximum total velocity equal to or less than the maximum object velocity assumption described above; and bound line $L_0$ to this range of $V_{tan,0}$ and $\omega_0$ values. The autonomous vehicle can additionally or alternatively bound line $L_0$ to the maximum tangential and angular velocity assumptions of ground-based objects described above.

Then, given $V_{rad,0}$ of the object at time $T_0$ and the range of $V_{tan,0}$ and $\omega_0$ motion combinations represented on bounded line $L_0$, the autonomous vehicle can calculate a range of possible total velocities of the object relative to the autonomous vehicle at $T_0$. Additionally or alternatively, the autonomous vehicle can merge its absolute velocity at $T_0$ with $V_{rad,0}$ of the object and the range of $V_{tan,0}$ and $\omega_0$ motion combinations represented on this bounded line $L_0$ to calculate a range of possible absolute velocities of the object at $T_0$.

4.2 Motion Disambiguation: Second Scan Cycle

The autonomous vehicle can then repeat the foregoing process based on a next set of radial velocities, distances, and angular positions of points output by the sensor during a next scan cycle.

In particular, at a second time $T_1$, the sensor executes a second scan cycle and returns a second scan image containing radial velocities, distances, and angular positions of a constellation of points throughout the field around the autonomous vehicle. The autonomous vehicle then implements methods and techniques described above: to identify a group of points corresponding to discrete objects in the field; and to track the group of points representing the object from the first scan cycle to a corresponding group of points representing the object in this second scan cycle.

The autonomous vehicle then repeats the process described above to: calculate a central measure of the radial velocities of points in this group; store this central measure as a radial velocity $V_{rad,1}$ of the object at time $T_1$; calculate a second slope $S_1$ for these data, which represents a relationship between the tangential velocity $V_{tan,1}$ and the angular velocity $\omega_1$ of the object at time $T_1$. For example, this slope $S_1$ may represent a difference between: $V_{tan,1}$; and the product of $\omega_1$ of the object at $T_1$ multiplied by a first radius $R_1$ of the object position, relative to the autonomous vehicle, at time $T_1$. The autonomous vehicle can therefore calculate the radius $R_1$ of a measure of central tendency of the position of the group of points that represent the object at $T_1$ and generate a second function (e.g., a linear function) $F_1$ that relates $V_{tan,1}$ and $\omega_1$ of the object based on slope $S_1$ and radius $R_1$ at time $T_1$.

Based on function $F_1$, the autonomous vehicle can then calculate line $L_1$, which represents possible $V_{tan,1}$ and $\omega_1$ motion combinations of the object at time $T_1$ given the current radial velocity $V_{rad,1}$ of the object at $T_1$.

Subsequently, the autonomous vehicle can calculate an intersection of lines $L_0$ and $L_1$ (or functions $F_0$ and $F_1$) which represents the actual (or a close approximation of) $V_{tan,1}$ and $\omega_1$ of the object at $T_1$. Thus, from the first scan cycle at $T_0$ to the subsequent scan cycle at $T_1$, the autonomous vehicle can solve all three unknown motion characteristics of the object—including $V_{tan,1}$, oi, and $V_{rad,1}$—at $T_1$.

Then, given $V_{rad,1}$, $V_{tan,1}$, and $\omega_1$ represented at the intersection of line $L_0$ and $L_1$, the autonomous vehicle can calculate the total velocity $V_{tot,rel,1}$ of the object relative to the autonomous vehicle at $T_1$. Additionally or alternatively, the autonomous vehicle can merge its absolute velocity at $T_1$ with $V_{rad,1}$, $V_{tan,1}$, and $\omega_1$ of the object to calculate the total absolute velocity $V_{tot,abs,1}$ of the object at $T_1$.

Therefore, in the foregoing implementation, the autonomous vehicle can: project second radial velocities versus second azimuthal positions of points—in the second group of points representing the object—onto a horizontal plane (i.e., a 2D space approximately parallel to a road surface); calculate a second radius of the object at the second time based on a range of second azimuthal positions of points in the second group of points; calculate a second radial velocity of the object—relative to the autonomous vehicle—at the second time based on a second measure of central tendency (e.g., a mean) of second radial velocities of points in the second group of points; calculate a second linear trend line through second radial velocities versus second azimuthal positions of points in the second group of points; and calculate a second correlation based on a second slope of the second linear trend line, which represents a relationship between a second tangential velocity of the object and a second angular velocity of the object at the second time. In particular, the second slope can represent a difference between: the second tangential velocity of the object at the second time; and the product of the second radius of the object at the second time and the second angular velocity of the object at the second time. The autonomous vehicle can then calculate a second linear function that relates possible tangential velocities of the object at the second time and possible angular velocities of the object, relative to the autonomous vehicle, at the second time based on the second slope and the second radius at the second time (e.g., the possible tangential velocities and angular velocities satisfies the relation: $S_1=V_{tan,1}-R_1\omega_1$). More specifically, this second function can relate possible tangential velocities of the object and possible angular velocities of the object, at the second time, within a horizontal plane approximately parallel to a road surface.

The autonomous vehicle can then estimate a specific second tangential velocity of the object and a specific second angular velocity of the object (or a narrow range of possible tangential and angular motions of the object, as described below)—relative to the autonomous vehicle—at the second time based on the intersection of the first function and the second function in a three-degree-of-freedom state space. Furthermore, the autonomous vehicle can execute methods and techniques described above to calculate the total absolute velocity of the object—relative to the autonomous vehicle—at the second time based on the second tangential velocity of the object, the second angular velocity of the object, the second radial velocity of the object, and absolute velocity of the object at the second time.

The autonomous vehicle can then: implement methods and techniques described above to calculate a future state boundary of the object based on these possible relative or absolute velocities of the object and maximum object acceleration assumptions; and selectively modify its trajectory accordingly, as described above.

5. DATA CAPTURE AND 3D OBJECT RECONSTRUCTION

In one implementation, as shown in FIG. 2A, during a data capture period, the vehicle can: access a first depth map—generated by a depth sensor—including a first set of pixels representing relative positions of a first set of surfaces relative to a field of view of the depth sensor and annotated with radial velocities of the first set of surfaces at a first time in Block S102; detect a first cluster of pixels, in the first set of pixels, exhibiting congruent radial velocities in Block S104; and correlate the first cluster of pixels with a first object in the field of view of the depth sensor in Block S106.

Additionally, the vehicle can: access a second depth map—generated by the depth sensor—including a second set of pixels representing relative positions of a second set of surfaces relative to the field of view of the depth sensor and annotated with radial velocities of the second set of surfaces at a second time succeeding the first time in Block S122; detect a second cluster of pixels, in the second set of pixels, exhibiting congruent radial velocities in Block S124; and correlate the second cluster of pixels with the first object in the field of view of the depth sensor in Block S126.

The vehicle can execute the foregoing methods and techniques to characterize motion of the second object based on positions and radial velocities of surfaces represented by the third cluster of pixels and the fourth cluster of pixels in Block S130.

Additionally, the vehicle can: characterize a set of operating conditions of the vehicle (e.g., traffic conditions; current weather; a road type; and/or local pedestrian volume); and associate the set of operating conditions with the motion of the second object.

In another implementation, the vehicle can: aggregate the clusters of points representing the object across multiple depth maps; and compile these clusters of points into a 3D representation of the object. More specifically, the system can: generate the 3D representation of the object based on motion of the vehicle at the first time and the second time and derived motion of the object at these times. For example, the vehicle can: correlate the first cluster of points and the second cluster of points with a first object in the field of view of the depth sensor; characterize motion of the first object in three degrees of freedom at the first time and the second time based on positions and radial velocities of surfaces represented by the first cluster of points and the second cluster of points; aggregate the first cluster of points and the second cluster of points into a first 3D object representation of the first object in Blocks S108 and S128; and associate the first 3D object representation of the first object with motion of the first object in Block S140.

In this example, the vehicle can further associate the 3D object representation with the derived motion of the object, such as: maximum and minimum absolute observed radial, tangential, and angular velocities; changes in motion of the object concurrent with changes in presence, relative position, and/or speed of other objects nearby; and changes in motion of the object concurrent with changes in right of way, scene, or signage near the object; etc. The vehicle can then: repeat this process for the object while the object is in the field of view of the vehicle to access additional absolute motions of the object; and augment the 3D object representation with additional clusters of points. Thus, the vehicle can aggregate points from clusters of points depicting the object over time into one composite representation of the object, thereby increasing the resolution of the 3D representation of the object. The vehicle can further aggregate and compile motion characteristics of the object during the observation period, such as basic motion bounds in three (or six) degrees of freedom and/or more complex motion changes responsive to changing conditions around the object.

The vehicle can then aggregate the 3D object representation and the motion of the object into a corpus of 3D object representations in Block S142. For example, the vehicle can transmit the 3D object representation of the object to the remote computer system storing the corpus of 3D object representations.

Additionally, the vehicle can: repeat collection of depth maps and detection clusters of points representing other objects in the depth maps to generate 3D object representations of the objects; and annotate the 3D object representation for each object with characteristics, such as: position, motion, size, geometry, and context of other objects near the object. Accordingly, the vehicle can: generate a population of 3D object representations labeled or annotated with observed absolute motion characteristics; and transmit the population of 3D object representations to the remote computer system.

5.1 Outlier Pixel Detection+Removal

In one implementation, the vehicle can filter each depth map to remove a set of extraneous or outlier pixels that do not exhibit congruent radial velocities to detected point clouds in the depth map. For example, the vehicle can: access the second depth map generated by the depth sensor including, a third set of pixels representing relative positions of a third set of surfaces in a field of view of the depth sensor and annotated with radial velocities of the set of surfaces at the second time; and, in response to detecting incongruent radial velocities in the third set of pixels relative to the second set of pixels, filter the depth map to remove the third set of pixels from the second cluster of points. Thus, in this example, the vehicle can filter or remove the set of outlier pixels to prevent aggregation of the set of outlier pixels into the first 3D object representation of the first object. Therefore, the vehicle can increase resolution of the 3D object reconstruction as the vehicle accesses subsequent depth maps by removing outlier clusters of points from the 3D object reconstruction that do not exhibit congruent behavior (e.g., motion behavior) as the clusters of points in the 3D object reconstruction.

6. OBJECT CLASSIFICATION

Blocks of the method S100 recite: accessing a corpus of three-dimensional object representations, of a population of objects, annotated with motions in Block S150; isolating the first group of three-dimensional object representations, in the corpus of three-dimensional object representations, characteristic of analogous object geometries in Block S152; and deriving the first set of motion characteristics of the first object class based on motions associated with three-dimensional object representations in the first group of three-dimensional object representations in Block S154.

Generally—as shown in FIG. 2B—in Blocks S150, S152, and S154, the remote computer system can: aggregate 3D object representations generated by a vehicle during a data capture period; compile these 3D representations into groups of 3D object representations exhibiting analogous object geometries; and derive a set of motion characteristics representative of each group of 3D object representations. The remote computer system can then define each group of 3D object representations as a distinct object class exhibiting analogous object geometrics and exhibiting the set of motion characteristics.

6.1 3D Object Representations and Object Class

In one implementation, in Block S150, the remote computer system can access (or "aggregate") a corpus of 3D object representations, of a population of objects, annotated with motions. For example, the remote computer system can receive 3D object representations—and corresponding motion characteristics—from a vehicle (or a fleet of vehicles) during a data capture period.

In another implementation, in Block S152, the remote computer system can isolate a first group of three-dimensional object representations, in the corpus of three-dimensional object representations, characteristic of analogous object geometries.

More specifically, the remote computer system can: select a first 3D object representation in the corpus of 3D object representations; and, for a second 3D object representation in the population of 3D object representations, calculate a first transform (e.g., a transform including yaw rotation, tangential and radial translation only) that reduces (or minimizes) error between at least a threshold proportion (e.g., 50%) of points in the first and second 3D object representations. The remote computer system can: repeat calculation of transforms for the remainder of the corpus of 3D object representations to calculate a first set of transforms that reduce (or minimize) error between at least the threshold proportion of points in the first 3D object representation and each other 3D object representation in the corpus of 3D object representations.

The remote computer system can: repeat calculation of transforms for each 3D object representation in the corpus of 3D object representation to calculate a matrix of transforms that similarly reduce (or minimize) errors between pairs of 3D object representations; and group pairs of 3D object representations exhibiting minimized errors falling below a threshold error to form a set of 3D object representation pair cascades, each 3D object representation pair cascade predicted to represent an entire volume of one object class when combined.

The remote computer system can then: define an object class for each 3D object representation pair cascade; calculate transforms between pairs of 3D object representations to compile a set of 3D object representation pairs (e.g., all of the 3D object representation pairs) in the first cascade into one composite point cloud that represents a (more) complete three-dimensional object characteristic of a first object class.

The remote computer system can repeat calculation of transforms for the other cascades to create a composite point cloud—representing a three-dimensional object—characteristic of each object class. For example, the remote computer system can aggregate groups of 3D object representations—exhibiting similar or identical geometries—into multiple distinct object classes, such as: a pedestrian vehicle (e.g., a sports utility vehicle, a sedan) class; a semi-trailer truck class; a pedestrian class; a motorcycle class; a bicycle class; and/or an all-terrain vehicle class.

In one example, the remote computer system: accesses a corpus of 3D object representations—of a population of objects—including a first 3D object representation of a first object and a second 3D object representation of a second object; and calculates a first transform, in a first set of transforms, that reduces a first error between at least a threshold proportion of points in the first 3D object representation and the second 3D object representation.

Additionally, for each other 3D object representation in the corpus of 3D object representations (e.g., excluding the first 3D object representation and the second 3D object representation), the remote computer system calculates a transform, in the first set of transforms, that reduces error between at least the threshold proportion of points in the first 3D object representation and the other 3D object representation.

In this example, the remote computer system repeats the foregoing methods and techniques, for each 3D object representation in the corpus of 3D object representations, to calculate a set of transforms—in a matrix of transforms including the first set of transforms—that reduces error between at least the threshold proportion of points in the 3D object representation and other 3D object representations in the corpus of 3D object representations.

The remote computer system can then generate a first 3D object representation cascade including pairs of 3D object representations—in the corpus of 3D object representations—exhibiting minimized errors falling below the threshold error. More specifically, the remote computer system can generate the first 3D object representation cascade including the first 3D object representation and the second 3D object representation.

In this example, the remote computer system: defines a first object class corresponding to the first 3D object representation cascade; and defines a first geometry of the first object class based on a set of transforms between pairs of three-dimensional object representations in the first three-dimensional object representation cascade. More specifically, the remote computer system calculates transforms between pairs of 3D object representations—in the first 3D object representation cascade—to compile a set of 3D object representation pairs (e.g., all of the 3D object representation pairs) in the first cascade into one composite point cloud representing the first geometry of the first object class.

Therefore, the remote computer system can: define object classes based on similar and identical geometries of objects represented in past depth maps; and derive motion boundaries (or "behaviors") for each object class based on past observed motions of objects in each class. Thus, the remote computer system can: reduce (or eliminate) error associated with human labeling of objects and improve resolution of object detection rather than relying on color images in which human-readable object class labels (e.g., pedestrian, vehicle) are not necessary or useful for the machine; and reduce (or eliminate) computational resources associated with data collection since the remote computer system can automatically define object classes and derive motion boundaries with data contained in sequences of depth maps containing radial velocity information.

6.2 Motion Characteristics

Generally, in Block S154, the remote computer system can derive a set of motion characteristics representative of an object class.

In one implementation, the remote computer system can: retrieve a first set of motions associated with 3D object representations in the first group of 3D object representations; and derive the first set of motion characteristics—representative of the first object class—based on the first set of motions. For example, the remote computer system can derive: maximum and minimum (or average, median) speeds of an object in the first object class; maximum and minimum absolute observed radial, tangential, and angular velocities of the object; maximum and minimum linear acceleration (and deceleration) of the object; maximum and minimum angular acceleration (and deceleration) of the object; changes in motion of the object concurrent with changes in presence, relative position, and/or speed of other objects nearby; and changes in motion of the object concurrent with changes in right of way, scene, or signage near the object; etc.

Additionally, the remote computer system can derive first set of motion characteristics including a set of maneuvers (e.g., hypothesized maneuvers) based on the first set of motions.

In another implementation, the remote computer system can: identify a first subset of motions, in the first set of motions, as hazardous (e.g., malicious, dangerous, invalid) motions; identify a second subset of motions—in the first set of motions and excluding the first subset of motions—as valid motions; and derive the first set of motion characteristics of the first object class based on the second subset of motions.

In Block S156, the remote computer system can define the first object class exhibiting: the first geometry; and the first set of motion characteristics.

6.2.1 Context Characterization

In one implementation, the remote computer system can derive subsets of motion characteristics based on different local conditions (or "operating conditions") around the vehicle, such as: traffic conditions; current weather forecast; a road type; and/or local pedestrian volume; etc.

For example, the remote computer system can: isolate a first subset of motions, in the first set of motions associated with three-dimensional object representations in the first group of 3D object representations, associated with a first set of operating conditions (e.g., maintained asphalt fair weather); and derive a first subset of motion characteristics, in the first set of motion characteristics and associated with the first set of operating conditions, of the first object class based on the first subset of motions.

Thus, the remote computer system can increase specificity in object characterization by detecting changes to the dynamic environment surrounding the vehicle during an operating period of the vehicle.

6.3 Motion Signatures and Object Class

Figure 2D:
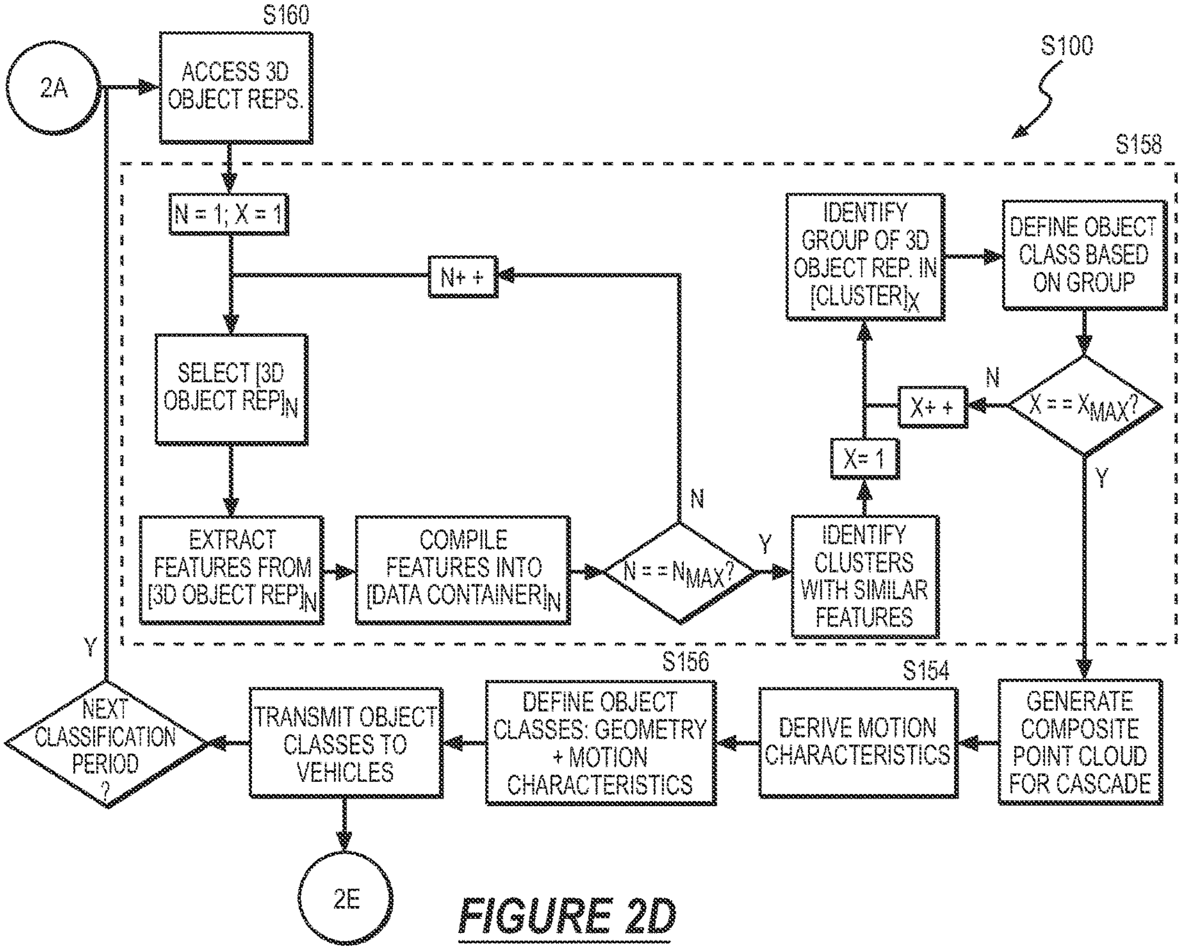

In one variation—as shown in FIG. 2D—in Block S158, the remote computer system can isolate the first group of 3D object representations, in the corpus of 3D object representations, characteristic of analogous object motion.

More specifically, in response to accessing the corpus of 3D object representations annotated with motions, the remote computer system can extract a set of features—from pixels aggregated into a 3D object representation, in the corpus of 3D object representations, and the motion associated with the 3D object representation in Block S140—representing motion of an object, such as: maximum and minimum (or average, median) speeds of the object; maximum and minimum absolute observed radial, tangential, and angular velocities of the object; maximum and minimum linear acceleration (and deceleration) of the object; maximum and minimum angular acceleration (and deceleration) of the object; etc. The remote computer system can compile the set of features into a data container (e.g., a vector) representing the set of features in a multi-dimensional feature space.

The remote computer system can repeat the foregoing methods and techniques for each 3D object representation in the corpus of 3D object representations to generate a set of data containers representing motion of the corpus of 3D object representations.

The remote computer system can group neighboring data containers (e.g., neighboring vectors)—in the set of data containers—in the multi-dimensional feature space into a set of discrete clusters (or "data container groups") exhibiting similar combinations of features and/or similar feature ranges in one or more dimensions in the multi-dimensional feature space. For each discrete cluster in the set of discrete clusters, the remote computer system can: identify (or isolate) a group of 3D object representations corresponding to data containers in the discrete cluster; and define an object class corresponding to the group of 3D object representations.

In one example, the computer system: groups a first subset of data containers, in the set of data containers, exhibiting a maximum speed exceeding a first threshold (e.g., twenty meters per second); identifies a first group of 3D object representations, in the corpus of 3D object representations, corresponding to the first subset of data containers; and defines a first object class—representing a vehicle object class—corresponding to the first group of 3D object representations.

In another example, the computer system: groups a second subset of data containers, in the set of data containers, exhibiting an angular acceleration exceeding a second threshold (e.g., ten radians per second); identifies a second group of 3D object representations, in the corpus of 3D object representations, corresponding to the second subset of data containers; and defines a second object class—representing a pedestrian object class—corresponding to the second group of 3D object representations.

The remote computer system can execute the foregoing methods and techniques: to define a geometry for an object class; and to derive a set of motion characteristics representative of the object class. Additionally, the remote computer system can derive the set of motion characteristics—representative of the object class—based on the combinations of features and/or feature ranges exhibited by the group 3D object representations based on which the object class is defined.

Accordingly, the remote computer system can define object classes based on similar and identical motion of objects (or "motion signatures") represented in past depth maps; and derive motion boundaries (or "behaviors") for each object class based on past observed motions of objects in each class.

6.4 Distribution

Generally, the remote computer system can then load the 3D composite object representations—and a corresponding set of motion characteristics (or "motion bounds")—for each object class onto a vehicle: to enable the vehicle to autonomously classify an object based on a geometry associated with the vehicle and observed in one or over multiple depth maps; to retrieve motion bounds previously observed for other objects in the object class; and to verify that intent of the object correlates with intent of previous objects in the object class, that the object's motion is predictable, and that the object exhibits a low risk of intent if the current (and past) motion of the object falls within the motion bounds of the corresponding object class.

In on implementation, in response to defining the object class characterized by the first geometry and the first set of motion characteristics, the remote computer system can transmit the first object class to a vehicle (e.g., each vehicle in a fleet of vehicles).

The remote computer system can execute the foregoing methods and techniques: to define a set of object classes exhibiting analogous object geometries; to define a set of motion characteristics representative for each object class in the set of object classes; and to distribute the set of object classes—and associated sets of motion characteristics—to vehicles.

9. AUTONOMOUS OPERATING PERIOD

Blocks of the method S100 recite: accessing a first depth map generated by a depth sensor arranged on a vehicle in Block S102, the first depth map including a first set of pixels representing relative positions of a first set of surfaces relative to a field of view of the depth sensor and annotated with radial velocities of the first set of surfaces at a first time; detecting a first cluster of pixels, in the first set of pixels, exhibiting congruent radial velocities in Block S104; accessing a second depth map generated by the depth sensor in Block S122, the second depth map including a second set of pixels representing relative positions of a second set of surfaces relative to the field of view of the depth sensor and annotated with radial velocities of the second set of surfaces at a second time; detecting a second cluster of pixels, in the second set of pixels, exhibiting congruent radial velocities in Block S124; and correlating the first cluster of pixels and the second cluster of pixels with a first object in the field of view of the depth sensor in Blocks S106 and S126.

Blocks of the method S100 recite: aggregating the first cluster of pixels and the second cluster of pixels into a first three-dimensional object representation of the first object in Blocks 108 and S128; accessing a first geometry, of a first object class, representing a first group of three-dimensional object representations characteristic of analogous object geometries in Block S164; and classifying the first object into the first object class based on congruence between the first three-dimensional object representation of the first object and the first geometry of the first object class in Block S168.

Blocks of the method S100 recite: accessing a first set of motion characteristics of the first object class in Block S166; and generating a first motion command based on the motion of the first object at the second time and the first set of motion characteristics of the first object class in Block S180.

Generally, as shown in FIG. 2C, during an autonomous operating period, the vehicle can: access depth maps captured at multiple instances in time by the depth sensor; detect clusters of points exhibiting congruent motion characteristics to generate a 3D object representation of an object in the field of view of the vehicle; and derive motion of the object during these instances in time. The vehicle can then: classify the object into an object class (e.g., a sports utility vehicle) based on congruence between the 3D object representation and the geometry of the object class; assign motion characteristics of the object class to the object; and execute actions based on congruence (or incongruence) between the motion of the object and the motion characteristics of the object class.

In one implementation, the vehicle can increase a distance between the vehicle and the object, in response to detecting anomalous motion characteristics of the object based on the object class. For example, in response to motion of the object falling outside of motion characteristics of the object class, the vehicle can: increase an avoidance distance between the object and the vehicle; and generate a motion command to increase an offset distance between the vehicle and the object according to the avoidance distance.

For example, during a first time period, the vehicle can detect that the motion of the object (e.g., a semi-trailer truck) traveling on a multi-lane expressway with negligible traffic is characteristic of motion characteristics associated with a semi-trailer truck class. Based on the motion characteristics of the object, the vehicle can identify that the motion characteristics are within motion bounds for the semi-trailer truck class. During a second time period, the vehicle can detect that the object is characteristic of motion behaviors that are anomalous (e.g., outside of the motion bounds for the semi-trailer truck class) for the object class (e.g., the semi-trailer truck is exhibiting motion characteristics, such as angular velocity, analogous to a resonance). Thus, the vehicle can increase the distance (e.g., from 15 m to 30 m) between the vehicle and the object (e.g., the semi-trailer truck) to increase safety relative to the environment. Therefore, when the vehicle detects movement of the object that is outside motion bounds for the class, the vehicle can maintain the new avoidance distance while the vehicle is in motion and as the object remains in the field of view of the vehicle.

Additionally or alternatively, the vehicle can trigger a change in motion behavior, in response to detecting motion characteristics of the object in the field of view of the vehicle falling outside threshold motion bounds for the object class associated with the object. For example, in response to motion of the second object falling outside of motion characteristics of the first object class, the vehicle can: characterize the environment surrounding the vehicle; and generate an action command to alter motion characteristics of the vehicle, such as change lanes, veer in a particular direction to avoid the object, decelerate, or reach a full stop. Thus, the vehicle can avoid a collision with the object by triggering a change in motion of the vehicle responsive to identifying that motion characteristics of the object in the field of view of the vehicle fall outside of threshold motion bounds for the object based on the object class corresponding to the object.

4.1 First Scan

In one implementation, the vehicle can execute the foregoing methods and techniques: to access a first depth map—generated by a depth sensor arranged on the vehicle—including a first set of pixels representing relative positions of a first set of surfaces relative to a field of view of the depth sensor and annotated with radial velocities of the first set of surfaces at a first time in Block S102; to detect a first cluster of pixels, in the first set of pixels, exhibiting congruent radial velocities in Block S104; and to correlate the first cluster of pixels with a first object in the field of view of the depth sensor in Block S106.

In another implementation, the vehicle can: aggregate the first cluster of pixels into a first 3D object representation of the first object in Block S108; access a first geometry—of a first object class—representing a first group of 3D object representations of analogous object geometries in Block S164; and classify the first object into the first object class based on congruence between the first 3D object representation of the first object and the first geometry of the first object class in Block S168.

4.1.1 Object Motion in First Scan and Vehicle Response

In one implementation, as shown in FIG. 3, the vehicle can execute the foregoing methods and techniques to characterize motion of the first object at the first time. For example, the vehicle can: calculate a first correlation between radial velocities and positions of surfaces represented by the first cluster of pixels in Block S112; based on the first correlation, calculate a first function relating a first set of combinations of possible tangential velocities of the first object and possible angular velocities of the first object coherent with radial velocities of the first set of surfaces in Block S114; and calculate a first total radial velocity of the first object at the first time based on radial velocities of surfaces in the first set of surfaces in Block S116.

In another implementation, the vehicle can: access a first set of motion characteristics of the first object class in Block S166; and generate a first motion command based on the motion of the first object at the first time and the first set of motion characteristics of the first object class in Block S180. More specifically, the vehicle can generate the first motion command based on: the first set of combinations of possible tangential velocities of the first object and possible angular velocities of the first object, at the first time, defined by the first function; the first total radial velocity of the first object; and the first set of motion characteristics.

In one example, the vehicle executes the methods and techniques described in U.S. patent application Ser. No. 17/182,165 to calculate a first future state boundary of the first object based on the motion of the first object at the first time in Block S170. More specifically, the vehicle can calculate the first future state boundary of the first object based on: the first set of combinations of possible tangential velocities of the first object and possible angular velocities of the first object, at the first time, defined by the first function; the first total radial velocity of the first object; and the first set of motion characteristics. In particular, the vehicle can calculate a first ground area accessible to the first object from the first time to a critical future time by integrating the radial velocity and possible tangential and angular velocity pairs (or the "first motion") of the object at the first time—moving at up to the maximum angular velocity and accelerating up to the maximum linear velocity according to the maximum linear acceleration defined by the first set of motion characteristics—from a first location of the first object over the stopping duration of the vehicle.

In this example, the vehicle generates a motion command to avoid entry into the first future state boundary.

In another example, the vehicle executes the foregoing methods and techniques to characterize the motion of the first object at the first time. In this example, the vehicle: accesses a first avoidance distance associated with the first object class in Block S162; and, in response to congruence between the motion of the first object at the first time and the first set of motion characteristics of the first object class, generates the first motion command according to the first avoidance distance.

Alternatively, in response to the motion of the first object at the first time falling outside of the first set of motion characteristics of the first object class, the vehicle: increases an avoidance distance, between the first object and the vehicle, from the first avoidance distance (e.g., fifteen meters) to a second avoidance distance (e.g., twenty meters); and generates the first motion command to increase an offset distance between the vehicle and the first object according to the second avoidance distance.

Accordingly, the vehicle can: detect an object within a field of view of the vehicle; characterize motion of the object based on limited motion data; and classify the object into an object class based on geometry of the object. Therefore, the vehicle can verify that intent of the object correlates with (or deviates from) intent of previous objects in the object class, that the object's motion is predictable, and that the object exhibits a low risk of intent if the current (and past) motion of the object falls within the motion bounds of the corresponding object class. Additionally, the vehicle can thereby trigger the vehicle to adjust motion behavior in response to detecting the object exhibiting anomalous motion relative to motion characteristics representative of objects in the object class.

4.1.2 Operating Conditions

Generally, the vehicle can define an initial avoidance distance based on a context of the environment (or "a set of operating conditions"). For example, the vehicle can: define a first avoidance distance for the vehicle based on a first set of operating conditions; and, in response to detecting a second set of operating conditions, adjust the first avoidance distance according to the second set of operating conditions.

In one implementation, during a first time period, the vehicle can: detect a first set of operating conditions (e.g., a sunny day with dry road conditions); and access (or derive) a first avoidance distance (e.g., ten meters) associated with the first set of operating conditions in Block S162.

In this implementation, during a second time period succeeding the first time period, the vehicle can: detect a second set of operating conditions (e.g., a thunderstorm at night with wet road conditions); and access (or derive) a second avoidance distance (e.g., 25 meters) associated with the second set of operating conditions in Block S162.

Thus, the vehicle can dynamically adjust the avoidance distance between the object and the vehicle in response to changes in the environment to reduce likelihood of collision with the object.

In one variation, in Block S166, the vehicle can access a first subset of motion characteristics—in the first set of motion characteristics of the first object class—associated with the first set of operating conditions.

4.2 Second Scan

In one implementation, the vehicle can execute the foregoing methods and techniques: to access a second depth map—generated by the depth sensor—including a second set of pixels representing relative positions of a second set of surfaces relative to the field of view of the depth sensor and annotated with radial velocities of the second set of surfaces at a second time succeeding the first time in Block S122; to detect a second cluster of pixels, in the second set of pixels, exhibiting congruent radial velocities in Block S124; and to correlate the second cluster of pixels with the first object in the field of view of the depth sensor in Block S126.

In another implementation, the vehicle can: aggregate the second cluster of pixels into the first three-dimensional object representation of the first object as a first updated three-dimensional object representation of the first object in Block S128; and to classify the first object into the first object class based on congruence between the first updated three-dimensional object representation of the first object and the first geometry of the first object class in Block S168.

4.2.1 Object Motion in Second Scan and Vehicle Response

In one implementation—as shown in FIG. 3—in Block S130, the vehicle can execute the foregoing methods and techniques to characterize motion of the first object at the second time based on positions and radial velocities of surfaces represented by the first cluster of pixels and the second cluster of pixels. For example, the vehicle can: calculate a second correlation between radial velocities and positions of surfaces represented by the second cluster of pixels in Block S132; based on the second correlation, calculate a second function relating a second set of combinations of possible tangential velocities of the first object and possible angular velocities of the first object coherent with radial velocities of the second set of surfaces in Block S134; calculate a second total radial velocity of the first object at the second time based on radial velocities of surfaces in the second set of surfaces in Block S136; and calculate a second tangential velocity of the first object and a second angular velocity of the second object at the second time based on an intersection of the first function and the second function in Block S138.

In another implementation, the vehicle can execute the foregoing methods and techniques: to access the first set of motion characteristics of the first object class in Block S166; and to generate a second motion command based on the motion of the first object at the second time and the first set of motion characteristics of the first object class in Block S180. More specifically, the vehicle can generate the second motion command based on: the second tangential velocity of the first object; the second angular velocity of the first object; the second total radial velocity of the first object; and the first set of motion characteristics.

In one example, the vehicle: accesses the first set of motion characteristics including a maximum angular velocity of objects in the first object class; and characterizes (or calculates) the second tangential velocity of the first object, the second angular velocity of the first object, and the second total radial velocity of the first object at the second time based on positions and radial velocities of surfaces represented by the first cluster of pixels and the second cluster of pixels. In this example, in response to the motion of the first object at the second time falling outside of the first set of motion characteristics of the first object class (e.g., the second angular velocity of the first object at the second time exceeding the maximum angular velocity), the vehicle: increases an avoidance distance, between the first object and the vehicle, from the first avoidance distance to the second avoidance distance; and generates the second motion command to increase an offset distance between the vehicle and the first object according to the second avoidance distance.

In another example, the vehicle executes methods and techniques described in U.S. patent application Ser. No. 17/182,165 to calculate a second future state boundary of the first object based on the motion of the first object at the second time in Block S170. More specifically, the vehicle can calculate the second future state boundary of the first object based on: the second total radial velocity of the first object; the second tangential velocity of the first object; the second angular velocity of the second object; and the first set of motion characteristics. In particular, the vehicle can calculate the second future state boundary by integrating the motion of the first object at the second time—moving at up to the maximum angular velocity and accelerating up to the maximum linear velocity according to the maximum linear acceleration prescribed by the first set of motion characteristics—from a second location of the first object over the stopping duration of the vehicle.

In this example, the vehicle generates a motion command based on the second future state boundary (e.g., to avoid entry into the second future state boundary).

Accordingly, by recalculating a future state boundary of the first object based on the first depth map and the second depth map, the vehicle can thereby (significantly) reduce a size of a possible ground area accessible to the first object. Therefore, the vehicle can calculate a larger access zone in which the vehicle may operate while avoiding collision with the first object.

4.2.2 Object Intent and Risk

In one variation, the vehicle can calculate the second future state boundary of the first object—representing a ground area accessible to the first object at a third time succeeding the second time—based on: the motion of the first object at the second time; and the first set of motion characteristics of the first object class.

Additionally, the vehicle can assign (or calculate) a first risk level (or score) to the first object based on the motion of the first object at the second time in Block S172.

In one example, in response to congruence between the motion of the first object at the second time and the first set of motion characteristics of the first object class, the vehicle assigns a “low” risk level to the first object.

In another example, in response to the motion of the first object at the first time falling outside of the first set of motion characteristics of the first object class, the vehicle assigns a “high” risk level to the first object.

In this variation, the vehicle executes the foregoing methods and techniques: to access a third depth map—generated by the depth sensor—including a third set of pixels representing relative positions of a third set of surfaces relative to the field of view of the depth sensor and annotated with radial velocities of the third set of surfaces at the third time; to detect a third cluster of pixels, in the third set of pixels, exhibiting congruent radial velocities; and to correlate the third cluster of pixels with the first object in the field of view of the depth sensor.

The vehicle can: calculate a location of the first object at the third time based on the third cluster of pixels in Block S172; in response to the location of the first object at the third time falling outside of the future state boundary, assign a second risk level (e.g., “high” risk level) to the first object in Block S174, the second risk level exceeding the first risk level (e.g., a “low” risk level); and, based on the second risk level assigned to the first object, generate a third motion command to increase an offset distance between the vehicle and the first object in Block S180.

Accordingly, the vehicle can: calculate a future state boundary of an object at a second time based on observed motion of an object at a first time; detect a location of the object—at the second time—falling outside of the future state boundary; and increase a risk level assigned to the object based on a decreased confidence in the object’s intent and/or predicted future motion (e.g., based on location of the object at the second time falling outside of the future state boundary). Therefore, the vehicle can: assign an increased avoidance distance to the object; and/or autonomously modify the vehicle’s motion (e.g., move away from the object, increase an offset distance from the object) to compensate for the increased risk level assigned to the object.

4.3 Classification by Motion Signature

Figure 2E:
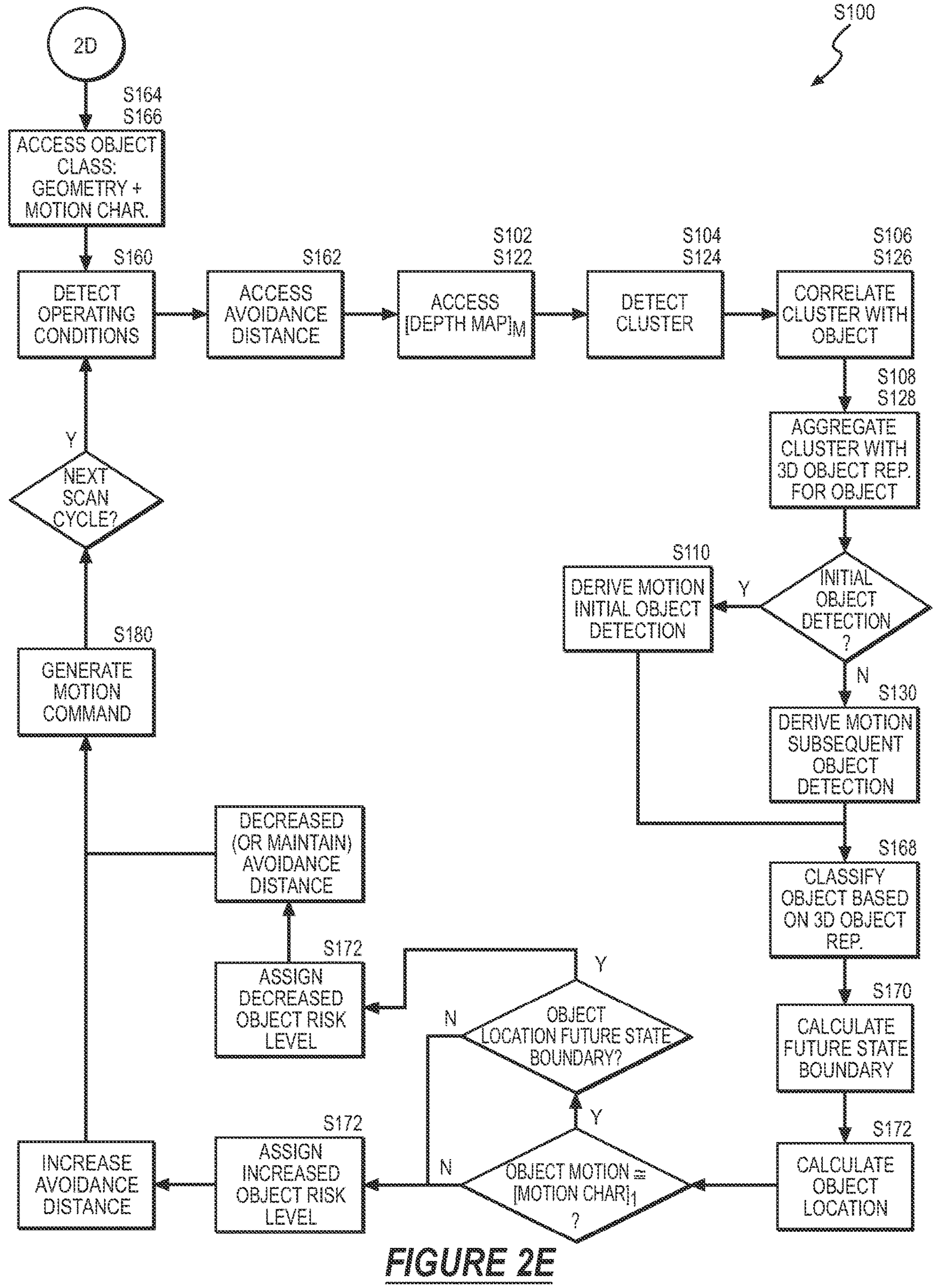

In another variation—as shown in FIG. 2E—the vehicle can: access a first set of motion characteristics of the first object class in Block S166; characterize motion of the first object in Blocks S110 and/or S130; and classify the first object into the first object class based on correspondence between the motion of the first object and the first set of motion characteristics of the first object class.

For example, the vehicle can access the first set of motion characteristics—associated with a passenger vehicle class—defining: a nominal speed range from zero miles per hour to ninety miles per hour; and a nominal angular velocity range from zero radians per second to five radians per second. In this example, the vehicle can characterize the motion of the first object at the second time including: a first speed of 80 miles per hour; and a first angular velocity of 0.5 radians per second. In response to the first speed falling within the nominal speed range and the first angular velocity falling within the nominal angular velocity range, the vehicle can classify the first object in the passenger vehicle object class.

5. CONCURRENT DATA FROM MULTIPLE SENSORS

In one variation, the autonomous vehicle includes multiple offset sensors that output concurrent point clouds—representing surfaces in the field around the autonomous vehicle at different perspectives—during a scan cycle. In this variation, the autonomous vehicle can execute the foregoing methods and techniques to: calculate a pair of functions and lines for cospatial groups of objects representing a singular object in concurrent point clouds output by these sensors during one scan cycle; calculate the intersection of these lines; and estimate the tangential and angular velocities of the object based on this intersection.

For example, the autonomous vehicle can: identify a first group of points—representing a discrete object—in a first point cloud output by a first sensor on the autonomous vehicle at a first time $T_0$; calculate an average of the radial velocities of points in this first group; store this average as a first radial velocity $V_{rad,1,0}$ of the object at the first time; calculate a first function $F_{1,0}$ based on the radial velocity $V_{rad,1,0}$, a slope $S_{1,0}$, and a radius $R_{1,0}$ of this first group of points at the first time; and calculate a first line $L_{1,0}$ based on function $F_{1,0}$. The autonomous vehicle can similarly: identify a second group of points—representing this same object—in a second point cloud output by a second sensor on the autonomous vehicle at the first time $T_0$; calculate an average of the radial velocities of points in this second group; store this average as a second radial velocity $V_{rad,2,0}$ of the object at the first time; calculate a second function $F_{2,0}$ based on the radial velocity $V_{rad,2,0}$, a slope $S_{2,0}$, and a radius $R_{2,0}$ of this second group of points at the first time; and calculate a second line $L_{2,0}$ based on function $F_{2,0}$.

The autonomous vehicle can then calculate the intersection of first line $L_{1,0}$ and second line $L_{2,0}$, which represents the actual (or a close approximation of) $V_{tan,0}$ and $\omega_0$ of the object at time $T_0$. Thus, the autonomous vehicle can solve all three unknown motion characteristics of the object—including $V_{tan,0}$, $\omega_0$, and $V_{rad,0}$—at $T_0$ based on data output by these two sensors during a single scan cycle.

Then, given $V_{rad,0}$, $V_{tan,0}$, and $\omega_0$ represented at the intersection of line $L_{1,0}$ and $L_{2,0}$, the autonomous vehicle can calculate the total velocity $V_{tot,rel,0}$ of the object relative to the autonomous vehicle at $T_0$. Additionally or alternatively, the autonomous vehicle can merge its absolute velocity at $T_0$ with $V_{rad,0}$, $V_{tan,0}$, and $\omega_0$ of the object to calculate the total absolute velocity $V_{tot,abs,0}$ of the object at $T_0$.

The autonomous vehicle can then: implement methods and techniques described above to calculate a future state boundary of the object based on these possible relative or absolute velocities of the object and maximum object acceleration assumptions; and selectively modify its trajectory accordingly, as described above.

Furthermore, the autonomous vehicle can: detect an object depicted in two concurrent scan images captured by two sensors on the autonomous vehicle during a first scan cycle; derive first function and the second function describing motion of this object from both scan images; and fuse these first function and the second function into one motion estimate of the object during this first scan cycle. Concurrently, the autonomous vehicle can: detect a second object depicted in only a first these two scan images (e.g., due to obscuration from the field of view of one of these sensors; or due to different fields of view of the two sensors); and derive a third function describing motion of this second object from the first scan image during the first scan cycle. Then, during a next scan cycle, the autonomous vehicle can: detect the second object depicted in only a third scan image; derive a fourth function describing motion of this second object from the third scan image; and fuse these third and fourth functions into one motion estimate of the second object during the second scan cycle, as described above.

Therefore, autonomous vehicle can implement the foregoing Blocks of the method S100 to characterize motions of a constellation of objects based on both concurrently scan images captured during a singular scan cycle and sequences of scan images captured over multiple scan cycles.

In another variation, as shown in FIG. 4, the vehicle can execute the foregoing methods and techniques: to access a first depth map—generated by a first depth sensor arranged on a vehicle—including a first set of pixels representing relative positions of a first set of surfaces relative to a first field of view of the first depth sensor and annotated with radial velocities of the first set of surfaces at a first time in Block S102; to detect a first cluster of pixels, in the first set of pixels, exhibiting congruent radial velocities in Block S104; to access a second depth map, generated by a second depth sensor, including a second set of pixels representing relative positions of a second set of surfaces relative to a second field of view of the second depth sensor and annotated with radial velocities of the second set of surfaces at the first time in Block S122; to detect a second cluster of pixels, in the second set of pixels, exhibiting congruent radial velocities in Block S124; to correlate the first cluster of pixels and the second cluster of pixels with a first object in the first field of view of the first depth sensor and in the second field of view of the second depth sensor in Blocks S106 and S126; and to aggregate the first cluster of pixels and the second cluster of pixels into a first 3D object representation of the first object in Block S108 and S128.

In this variation, the vehicle can then execute the foregoing methods and techniques: to access a first geometry, of a first object class, representing a first group of 3D object representations of analogous object geometries in Block S164; to classify the first object into the first object class based on congruence between the first 3D object representation of the first object and the first geometry of the first object class in Block S168; to characterize motion of the first object based on positions and radial velocities of surfaces represented by the first cluster of pixels and the second cluster of pixels in Block S130; to access a first set of motion characteristics of the first object class in Block S166; and, in response to the motion of the first object falling outside of the first set of motion characteristics of the first object class, to generate a motion command to increase an offset distance between the vehicle and the first object in Block S180.

6. REMOTE CLASSIFICATION

In one variation, during the autonomous operating period, the vehicle can transmit (or "offload")—to the remote computer system—depth maps captured across multiple instances in time by the depth sensor arranged on the vehicle. The remote computer system can then detect clusters of points exhibiting congruent motion characteristics to generate a 3D object representation of an object in the field of view of the vehicle. More specifically, the remote computer system can: correlate a set of clusters of points with an object; and aggregate the set of clusters of points into a 3D object representation of the object. The remote computer system can then classify the object in an object class (e.g., a sports utility vehicle) based on congruence between the 3D object representation and the geometry of the object class; and assign motion characteristics of the object class to the object. Therefore, the remote computer system can reduce computational resources associated with object characterization by automatically classifying objects according to object classes based on unique motion behaviors and characteristics associated with those object classes.

6.1 New Object Classes

In another variation, the remote computer system can detect new objects in the field of view of the vehicle and classify the objects based on motion characteristics unique to each object. For example, the remote computer system can: generate a second 3D object representation of a second object in the field of view of the vehicle; and compute an error between the second 3D object representation and the composite point cloud (3D representation) characteristic of each object class based on the set of transforms; and identify a target object class associated with the lowest error. More specifically, in response to identifying the lowest error falling below an error threshold, the remote computer system can characterize the second 3D object representation of the second object according to the target object class. In response to identifying the lowest error exceeding the error threshold, the remote computer system can characterize the second object as an unknown or undefined object class; and define a new object class for the second object. Thus, the remote computer system can reduce error (e.g., human error) associated with manual labeling and characterization of objects by automatically classifying objects into object classes according to similarities in motion behaviors.

7. OBJECT RECLASSIFICATION

In one implementation, the vehicle can execute the foregoing methods and techniques: to access depth maps captured across multiple instances in time by the depth sensor; to detect clusters of points exhibiting congruent motion characteristics; to generate a 3D object representation of an object in the field of view of the vehicle; to derive motion of the object during these instances in time; to classify the object into an object class based on congruence between the 3D object representation and the geometry of the object class; to assign motion characteristics of the object class to the object; and to execute actions based on congruence (or incongruence) between the motion of the object and the motion characteristics of the object class.

Additionally, the vehicle can: access additional depth maps captured by the depth sensor; detect additional clusters of points exhibiting congruent motion characteristics in these depth maps; update the 3D object representation of the object in the field of view of the vehicle based on these clusters of points; and classify the object into another object class based on congruence between the updated 3D object representation and the geometry of the other object class.

For example, in response to classifying the first object into the first object class and increasing an avoidance distance, between the first object and the vehicle, from a first avoidance distance to a second avoidance distance, the vehicle can: access a third depth map—generated by the depth sensor—including a third set of pixels representing relative positions of a third set of surfaces relative to the field of view of the depth sensor and annotated with radial velocities of the third set of surfaces at a third time succeeding the second time; detect a third cluster of pixels, in the third set of pixels, exhibiting congruent radial velocities; correlate the third cluster of pixels with the first object in the field of view of the depth sensor; and aggregate the third cluster of pixels into the first 3D object representation of the first object as a first updated 3D object representation of the first object.

In this example, the vehicle can: access a second geometry, of a second object class, representing a second group of 3D object representations of analogous object geometries; classify the first object into the second object class based on congruence between the first updated 3D object representation of the first object and the second geometry of the second object class; characterize motion of the first object at the third time based on positions and radial velocities of surfaces represented by the second cluster of pixels and the third cluster of pixels; and access a second set of motion characteristics of the second object class. In response to congruence between the motion of the first object at the third time and the second set of motion characteristics of the second object class, the vehicle can: decrease the second avoidance distance (e.g., twenty meters), between the first object and the vehicle, to a third avoidance distance (e.g., fifteen meters); and generate a second motion command according to the third avoidance distance (e.g., maintain an offset distance between the vehicle and the first object according to the third avoidance distance).

8. COLOR CAMERA AUGMENTATION

Generally, the remote computer system can access sets of depth maps generated by one or more depth sensors arranged on the vehicle. In one implementation, the remote computer system can access a set of color images generated by one or more cameras (e.g., color cameras) arranged on the vehicle. More specifically, the remote computer system can detect a color-based point cloud based on color gradients in the color maps and correlate the color-based point cloud with a velocity-based point cloud associated with the depth map to generate a 3D object representation of the first object.

For example, during the data capture period, the remote computer system can: access a color image captured by a color camera arranged on the vehicle, the first color image including a first set of pixels representing a color gradient of a first set of surfaces in a field of view of the color camera at a first time; detect a first cluster of points, exhibiting congruent color values, in the first color image; access a first depth map generated by a depth sensor arranged on a vehicle, the first depth map including a first set of pixels representing relative positions of a first set of surfaces in a field of view of the depth sensor and annotated with radial velocities of the set of surfaces at the first time; detect a second cluster of points, exhibiting congruent radial velocities, in the first depth map; correlate the first cluster of points and the second cluster of points with a first object in the field of view of the depth sensor and the color camera; and aggregate the first cluster of points and the second cluster of points into a first 3D object representation of the first object. In this example, the remote computer system can access color images from a first set of color cameras (e.g., five) and access a set of depth maps from a second set of depth sensors (e.g., two). Thus, the remote computer system can reduce computational resources associated with processing depth maps captured via depth sensors by accessing sets of images from color cameras, that are generally less computationally expensive, to characterize 3D object representations and derive motion characteristics of the object classes based on motions associated with the 3D object representations.

9. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising, during a first time period:

accessing a first depth map generated by a depth sensor arranged on a vehicle, the first depth map comprising a first set of pixels representing relative positions of a first set of surfaces relative to a field of view of the depth sensor and annotated with radial velocities of the first set of surfaces at a first time;

detecting a first cluster of pixels, in the first set of pixels, exhibiting congruent radial velocities;

accessing a second depth map generated by the depth sensor, the second depth map comprising a second set of pixels representing relative positions of a second set of surfaces relative to the field of view of the depth sensor and annotated with radial velocities of the second set of surfaces at a second time;

detecting a second cluster of pixels, in the second set of pixels, exhibiting congruent radial velocities;

correlating the first cluster of pixels and the second cluster of pixels with a first object in the field of view of the depth sensor;

aggregating the first cluster of pixels and the second cluster of pixels into a first three-dimensional object representation of the first object;

accessing a first geometry, of a first object class, representing a first group of three-dimensional object representations characteristic of analogous object geometries;

classifying the first object into the first object class based on congruence between the first three-dimensional object representation of the first object and the first geometry of the first object class;

characterizing motion of the first object at the second time based on positions and radial velocities of surfaces represented by the first cluster of pixels and the second cluster of pixels;

accessing a first set of motion characteristics of the first object class; and by a controller, in response to the motion of the first object at the second time falling outside of the first set of motion characteristics of the first object class:

increasing a first avoidance distance, between the first object and the vehicle, to a second avoidance distance; and generating a first motion command that controls a set of actuators within the vehicle to increase an offset distance between the vehicle and the first object according to the second avoidance distance.

2. The method of claim 1, further comprising, during a second time period preceding the first time period:

accessing a corpus of three-dimensional object representations, of a population of objects, annotated with motions;

isolating the first group of three-dimensional object representations, in the corpus of three-dimensional object representations, characteristic of analogous object geometries; and deriving the first set of motion characteristics of the first object class based on motions associated with three-dimensional object representations in the first group of three-dimensional object representations.

3. The method of claim 2, further comprising, during a third time period preceding the second time period:

accessing a third depth map generated by the depth sensor, the third depth map comprising a third set of pixels representing relative positions of a third set of surfaces relative to the field of view of the depth sensor and annotated with radial velocities of the third set of surfaces at a third time preceding the first time;

detecting a third cluster of pixels, in the third set of pixels, exhibiting congruent radial velocities;

accessing a fourth depth map generated by the depth sensor, the fourth depth map comprising a fourth set of pixels representing relative positions of a fourth set of surfaces relative to the field of view of the depth sensor and annotated with radial velocities of the fourth set of surfaces at a fourth time succeeding the third time and preceding the first time;

detecting a fourth cluster of pixels, in the fourth set of pixels, exhibiting congruent radial velocities;

correlating the third cluster of pixels and the fourth cluster of pixels with a second object in the field of view of the depth sensor;

aggregating the third cluster of pixels and the fourth cluster of pixels into a second three-dimensional object representation of the second object;

characterizing motion of the second object based on positions and radial velocities of surfaces represented by the third cluster of pixels and the fourth cluster of pixels;

associating the motion of the second object with the second three-dimensional object representation of the second object; and aggregating the second three-dimensional object representation and the motion of the second object into the corpus of three-dimensional object representations.

4. The method of claim 2, wherein deriving the first set of motion characteristics comprises:

retrieving a set of motions associated with three-dimensional object representations in the first group of three-dimensional object representations;

identifying a first subset of motions, in the set of motions, as hazardous motions;

identifying a second subset of motions, in the set of motions and excluding the first subset of motions, as valid motions; and deriving the first set of motion characteristics based on the second subset of motions.

5. The method of claim 2, wherein isolating the first group of three-dimensional object representations comprises:

accessing a corpus of three-dimensional object representations, of a population of objects, comprising:

a second three-dimensional object representation of a second object; and a third three-dimensional object representation of a third object;

calculating a first transform, in a matrix of transforms, that reduces a first error between at least a threshold proportion of points in the second three-dimensional object representation and the third three-dimensional object representation;

in response to the first error falling below a threshold error, generating a first three-dimensional object representation cascade comprising the second three-dimensional object representation and the third three-dimensional object representation;

defining the first object class corresponding to the first three-dimensional object representation cascade; and defining the first geometry of the first object class based on a set of transforms between pairs of three-dimensional object representations in the first three-dimensional object representation cascade.

6. The method of claim 1:

wherein accessing the first set of motion characteristics comprises accessing the first set of motion characteristics comprising a maximum angular velocity of objects in the first object class;

wherein characterizing motion of the first object at the second time comprises calculating a second angular velocity, of the first object at the second time, based on positions and radial velocities of surfaces represented by the first cluster of pixels and the second cluster of pixels; and wherein generating the first motion command comprises, in response to the second angular velocity of the first object at the second time exceeding the maximum angular velocity, generating the first motion command to increase an offset distance between the vehicle and the first object.

7. The method of claim 1, further comprising, during a second time period succeeding the first time period:

accessing a third depth map generated by the depth sensor, the third depth map comprising a third set of pixels representing relative positions of a third set of surfaces relative to the field of view of the depth sensor and annotated with radial velocities of the third set of surfaces at a third time succeeding the second time;

detecting a third cluster of pixels, in the third set of pixels, exhibiting congruent radial velocities;

correlating the third cluster of pixels with the first object in the field of view of the depth sensor;

aggregating the third cluster of pixels into the first three-dimensional object representation of the first object as a first updated three-dimensional object representation of the first object;

accessing a second geometry, of a second object class, representing a second group of three-dimensional object representations of analogous object geometries;

classifying the first object into the second object class based on congruence between the first updated three-dimensional object representation of the first object and the second geometry of the second object class;

characterizing motion of the first object at the third time based on positions and radial velocities of surfaces represented by the second cluster of pixels and the third cluster of pixels;

accessing a second set of motion characteristics of the second object class;

in response to congruence between the motion of the first object at the third time and the second set of motion characteristics of the second object class, decreasing the second avoidance distance, between the first object and the vehicle, to a third avoidance distance; and generating a second motion command according to the third avoidance distance.

8. The method of claim 1:

further comprising, during the first time period:

calculating a future state boundary of the first object, representing a ground area accessible to the first object at a third time succeeding the second time, based on:

the motion of the first object at the second time; and the first set of motion characteristics of the first object class; and assigning a first risk level to the first object based on the motion of the first object at the second time; and wherein generating the first motion command comprises generating the first motion command based on the future state boundary of the first object.

9. The method of claim 8, wherein assigning the first risk level to the first object comprises assigning the first risk level to the first object based on congruence between the motion of the first object at the second time and the first set of motion characteristics of the first object class.

10. The method of claim 8, further comprising, during a second time period succeeding the first time period:

accessing a third depth map generated by the depth sensor, the third depth map comprising a third set of pixels representing relative positions of a third set of surfaces relative to the field of view of the depth sensor and annotated with radial velocities of the third set of surfaces at the third time;

detecting a third cluster of pixels, in the third set of pixels, exhibiting congruent radial velocities;

correlating the third cluster of pixels with the first object in the field of view of the depth sensor;

calculating a location of the first object at the third time based on the third cluster of pixels;

in response to the location of the first object at the third time falling outside of the future state boundary, assigning a second risk level to the first object, the second risk level exceeding the first risk level; and based on the second risk level assigned to the first object, generating a second motion command to increase the offset distance between the vehicle and the first object.

11. The method of claim 1:

wherein accessing the first geometry comprises receiving the first geometry from a remote computer system;

wherein accessing the first set of motion characteristics comprises receiving the first set of motion characteristics of the first object class from the remote computer system; and further comprising:

associating the first three-dimensional object representation of the first object with the motion of the first object at the second time; and transmitting the first three-dimensional object representation of the first object to the remote computer system.

12. The method of claim 1, wherein characterizing the motion of the first object at the second time comprises:

calculating a first correlation between radial velocities and positions of surfaces represented by the first cluster of pixels;

based on the first correlation, calculating a first function relating a first set of combinations of possible tangential velocities of the first object and possible angular velocities of the first object coherent with radial velocities of the first set of surfaces;

calculating a second correlation between radial velocities and positions of surfaces represented by the second cluster of pixels;

based on the second correlation, calculating a second function relating a second set of combinations of possible tangential velocities of the first object and possible angular velocities of the first object coherent with radial velocities of the second set of surfaces;

calculating a second total radial velocity of the first object at the second time based on radial velocities of surfaces in the second set of surfaces; and calculating a second tangential velocity of the first object and a second angular velocity of the second object at the second time based on an intersection of the first function and the second function.

13. The method of claim 12:

further comprising calculating a future state boundary of the first object based on:

the second total radial velocity of the first object;

the second tangential velocity of the first object;

the second angular velocity of the second object; and the first set of motion characteristics; and wherein generating the first motion command comprises generating the first motion command to avoid entry into the future state boundary.

14. A method comprising, during a first time period:

accessing a first depth map generated by a depth sensor arranged on a vehicle, the first depth map comprising a first set of pixels representing relative positions of a first set of surfaces relative to a field of view of the depth sensor and annotated with radial velocities of the first set of surfaces at a first time;

detecting a first cluster of pixels, in the first set of pixels, exhibiting congruent radial velocities;

accessing a second depth map generated by the depth sensor, the second depth map comprising a second set of pixels representing relative positions of a second set of surfaces relative to the field of view of the depth sensor and annotated with radial velocities of the second set of surfaces at a second time;

detecting a second cluster of pixels, in the second set of pixels, exhibiting congruent radial velocities;

correlating the first cluster of pixels and the second cluster of pixels with a first object in the field of view of the depth sensor;

aggregating the first cluster of pixels and the second cluster of pixels into a first three-dimensional object representation of the first object;

accessing a first geometry, of a first object class, representing a first group of three-dimensional object representations characteristic of analogous object geometries;

classifying the first object into the first object class based on congruence between the first three-dimensional object representation of the first object and the first geometry of the first object class;

characterizing motion of the first object at the second time based on positions and radial velocities of surfaces represented by the first cluster of pixels and the second cluster of pixels;

accessing a first set of motion characteristics of the first object class;

calculating a future state boundary of the first object, representing a ground area accessible to the first object at a third time succeeding the second time, based on:

the motion of the first object at the second time; and the first set of motion characteristics of the first object class;

assigning a first risk level to the first object based on the motion of the first object at the second time; and at a controller, generating a first motion command that controls a set of actuators of the vehicle based on the future state boundary of the first object.

15. The method of claim 14, wherein assigning the first risk level to the first object comprises assigning the first risk level to the first object based on congruence between the motion of the first object at the second time and the first set of motion characteristics of the first object class.

16. The method of claim 14:

wherein accessing the first set of motion characteristics of the first object class comprises, in response to detecting a first set of operating conditions, accessing the first set of motion characteristics, of the first object class, associated with the first set of operating conditions;

further comprising accessing a first avoidance distance associated with the first set of operating conditions; and wherein generating the first motion command comprises, in response to congruence between the motion of the first object at the second time and the first set of motion characteristics of the first object class, generating the first motion command according to the first avoidance distance.

17. The method of claim 14, further comprising, during a second time period succeeding the first time period:

accessing a third depth map generated by the depth sensor, the third depth map comprising a third set of pixels representing relative positions of a third set of surfaces relative to the field of view of the depth sensor and annotated with radial velocities of the third set of surfaces at the third time;

detecting a third cluster of pixels, in the third set of pixels, exhibiting congruent radial velocities;

correlating the third cluster of pixels with the first object in the field of view of the depth sensor;

calculating a location of the first object at the third time based on the third cluster of pixels;

in response to the location of the first object at the third time falling outside of the future state boundary, assigning a second risk level to the first object, the second risk level exceeding the first risk level; and based on the second risk level assigned to the first object, generating a second motion command to increase an offset distance between the vehicle and the first object.

18. A method comprising, at a controller of a vehicle during a first time period:

accessing a first depth map generated by a depth sensor arranged on a vehicle, the first depth map comprising a first set of pixels representing relative positions of a first set of surfaces relative to a field of view of the depth sensor and annotated with radial velocities of the first set of surfaces at a first time;

detecting a first cluster of pixels, in the first set of pixels, exhibiting congruent radial velocities;

accessing a second depth map generated by the depth sensor, the second depth map comprising a second set of pixels representing relative positions of a second set of surfaces relative to the field of view of the depth sensor and annotated with radial velocities of the second set of surfaces at a second time;

detecting a second cluster of pixels, in the second set of pixels, exhibiting congruent radial velocities;

correlating the first cluster of pixels and the second cluster of pixels with a first object in the field of view of the depth sensor;

aggregating the first cluster of pixels and the second cluster of pixels into a first three-dimensional object representation of the first object;

accessing a first geometry, of a first object class, representing a first group of three-dimensional object representations characteristic of analogous object geometries;

classifying the first object into the first object class based on congruence between the first three-dimensional object representation of the first object and the first geometry of the first object class;

characterizing motion of the first object at the second time based on positions and radial velocities of surfaces represented by the first cluster of pixels and the second cluster of pixels;

in response to detecting a first set of operating conditions, accessing a first set of motion characteristics, of the first object class, associated with the first set of operating conditions;

accessing a first avoidance distance associated with the first set of operating conditions; and at a controller, generating a first motion command that controls a set of actuators of the vehicle according to the first avoidance distance.

* * * * *